US006936758B2

(12) United States Patent
Itoh

(10) Patent No.: US 6,936,758 B2
(45) Date of Patent: Aug. 30, 2005

(54) PLAYER INFORMATION-PROVIDING METHOD, SERVER, PROGRAM FOR CONTROLLING THE SERVER, AND STORAGE MEDIUM STORING THE PROGRAM

(75) Inventor: Toshihiro Itoh, Shizuoka-ken (JP)

(73) Assignee: Yamaha Corporation, Shizuoka-ken (JP)

( * ) Notice: Subject to any disclaimer, the term of this patent is extended or adjusted under 35 U.S.C. 154(b) by 201 days.

(21) Appl. No.: 10/382,329

(22) Filed: Mar. 5, 2003

(65) Prior Publication Data

US 2003/0167904 A1 Sep. 11, 2003

(30) Foreign Application Priority Data

Mar. 5, 2002 (JP) ........................................ 2002-059227

(51) Int. Cl.[7] .................................................. G09B 7/00
(52) U.S. Cl. ...................... 84/470 R; 84/477 R; 84/609
(58) Field of Search ............................... 84/477 R, 634, 84/609, 470 R; 434/322, 323, 335, 336, 346, 350, 362

(56) References Cited

U.S. PATENT DOCUMENTS

| | | | | | |
|---|---|---|---|---|---|
| 6,072,113 | A | * | 6/2000 | Tohgi et al. | 84/470 R |
| 6,211,451 | B1 | * | 4/2001 | Tohgi et al. | 84/470 R |
| 6,495,747 | B2 | * | 12/2002 | Shimaya et al. | 84/477 R |
| 6,653,545 | B2 | * | 11/2003 | Redmann et al. | 84/615 |
| 6,660,922 | B1 | * | 12/2003 | Roeder | 84/477 R |
| 2001/0029832 | A1 | * | 10/2001 | Kanda et al. | 84/609 |

* cited by examiner

*Primary Examiner*—Jeffrey W Donels
(74) *Attorney, Agent, or Firm*—Harness, Dickey & Pierce, P.L.C.

(57) ABSTRACT

There is provided a player information-providing method capable of providing a result of an objective judgment on a user's performance skill level in playing a musical instrument to each user to thereby support the users e.g. for smooth organization of a band. A result of a judgment made on a performance skill level of a player by a performance skill level-judging device for judging a player's performance skill level is stored in a server. In response to access of a user terminal device to the server via the Internet, the result of the judgment made on the performance skill level of the player is transmitted to the user terminal device via the Internet.

8 Claims, 22 Drawing Sheets

*FIG. 4*

| USER ID | CONTENTS OF PERFORMANCE SKILL LEVEL DATA | | PERSONAL INFORMATION |
|---|---|---|---|
| U-001 | PIANO | LV20 | 001@xxx.co.jp |
| U-002 | PIANO | LV30 | 002@xxx.co.jp |
| U-003 | PIANO | LV15 | 003@xxx.co.jp |
| ... | ... | ... | ... |

*FIG. 5*

| CHAT ROOM NAME | HANDLE NAME | USER ID | CONTENTS OF PERFORMANCE SKILL LEVEL DATA | |
|---|---|---|---|---|
| TECHNO CHAT ROOM | MR. A | U-001 | PIANO | LV20 |
| | MR. B | U-100 | DRUM | LV20 |
| | MR. C | U-200 | BASS | LV19 |
| | ... | ... | ... | ... |
| ROCK CHAT ROOM | ... | ... | ... | ... |
| ... | ... | ... | ... | ... |

FIG. 6

| SESSION ROOM NAME | HANDLE NAME | USER ID | CONTENTS OF PERFORMANCE SKILL LEVEL DATA | | STATE OF SESSION ROOM |
|---|---|---|---|---|---|
| TECHNO 001 | MR. A | U-001 | PIANO | LV20 | IN SESSION |
| | MR. B | U-100 | DRUM | LV20 | |
| | ... | ... | ... | ... | |
| ... | ... | ... | ... | ... | ... |

*FIG. 12*

| USER PERFORMANCE | | | | IDEAL PERFORMANCE | | | |
|---|---|---|---|---|---|---|---|
| MUSICAL TONE | EVENT | TIMING | VELOCITY | MUSICAL TONE | EVENT | TIMING | VELOCITY |
| C4 | NOTE-ON | Tm11 | Ve11 | C4 | NOTE-ON | Tm1 | Ve1 |
| C4 | NOTE-OFF | Tm12 | Ve12 | C4 | NOTE-OFF | Tm2 | Ve2 |
| D4 | NOTE-ON | Tm13 | Ve13 | D4 | NOTE-ON | Tm3 | Ve3 |
| D4 | NOTE-OFF | Tm14 | Ve14 | D4 | NOTE-OFF | Tm4 | Ve4 |
| E4 | NOTE-ON | Tm15 | Ve15 | E4 | NOTE-ON | Tm5 | Ve5 |
| ... | ⋮ | ⋮ | ⋮ | ⋮ | ⋮ | ⋮ | ⋮ |

FIG. 27

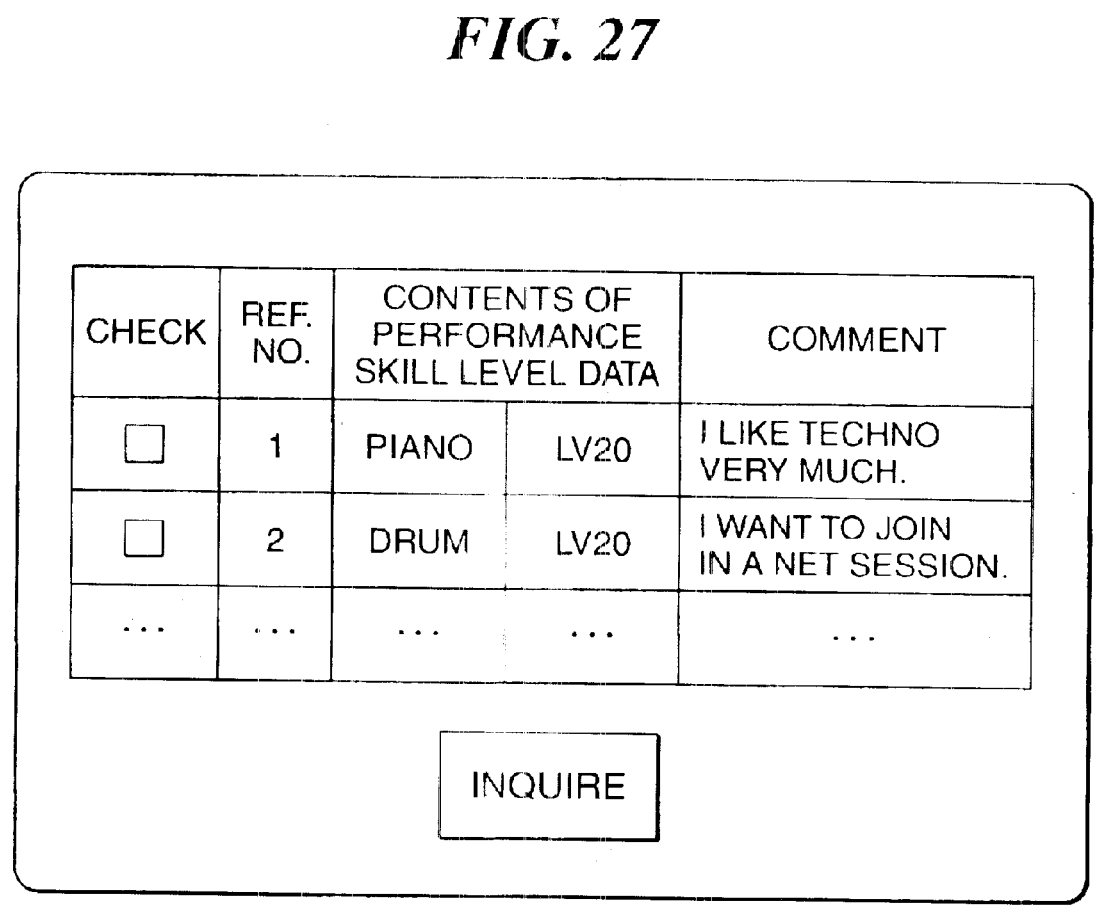

| CHECK | REF. NO. | CONTENTS OF PERFORMANCE SKILL LEVEL DATA | | COMMENT |
|---|---|---|---|---|
| ☐ | 1 | PIANO | LV20 | I LIKE TECHNO VERY MUCH. |
| ☐ | 2 | DRUM | LV20 | I WANT TO JOIN IN A NET SESSION. |
| . . . | . . . | . . . | . . . | . . . |

INQUIRE

*FIG. 28*

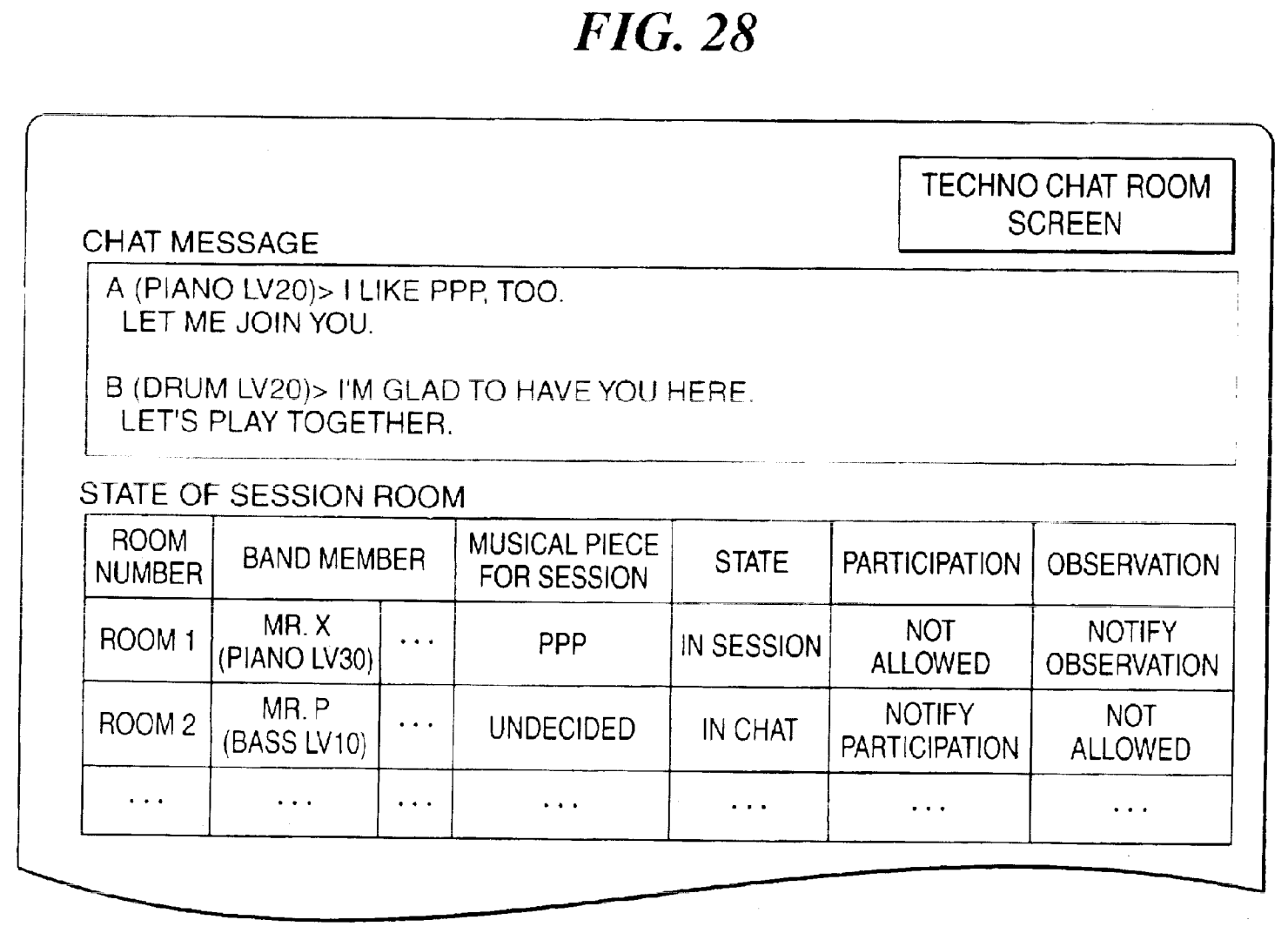

TECHNO CHAT ROOM SCREEN

CHAT MESSAGE

A (PIANO LV20)> I LIKE PPP, TOO.
LET ME JOIN YOU.

B (DRUM LV20)> I'M GLAD TO HAVE YOU HERE.
LET'S PLAY TOGETHER.

STATE OF SESSION ROOM

| ROOM NUMBER | BAND MEMBER | | MUSICAL PIECE FOR SESSION | STATE | PARTICIPATION | OBSERVATION |
|---|---|---|---|---|---|---|
| ROOM 1 | MR. X (PIANO LV30) | ... | PPP | IN SESSION | NOT ALLOWED | NOTIFY OBSERVATION |
| ROOM 2 | MR. P (BASS LV10) | ... | UNDECIDED | IN CHAT | NOTIFY PARTICIPATION | NOT ALLOWED |
| ... | ... | ... | ... | ... | ... | ... |

PLAYER INFORMATION-PROVIDING METHOD, SERVER, PROGRAM FOR CONTROLLING THE SERVER, AND STORAGE MEDIUM STORING THE PROGRAM

BACKGROUND OF THE INVENTION

1. Field of the Invention

The present invention relates to a player information-providing method, a server, a program for controlling the server, and a storage medium storing the program, and more particularly to a technique for informing users of a result of objective judgment on each user's musical instrument performance skill.

2. Description of the Related Art

When members (hereinafter referred to as "band members") to play musical instruments in a band are looked for, conventionally employed are a method of putting an advertisement for collecting band members in a music magazine, and/or a method of utilizing notice boards or walls in music shops.

However, whichever method may be employed, it is necessary to carry out a step of communicating with each other by phone, for instance, and hence it is impossible to start band activities instantly.

Although performance skills of band members are preferably on approximately the same level, particularly in continuing band activities, it has been impossible to accurately recognize each other's performance skill by any conventional method. Therefore, there are cases, for instance, in which differences in performance skill level among the members are recognized after the start of actual band activities, only to make the band activities unenjoyable.

SUMMARY OF THE INVENTION

It is an object of the present invention to provide a player information-providing method, and a server, which are capable of providing a result of an objective judgment on a user's performance skill level in playing a musical instrument to each user to thereby support the users e.g. for smooth organization of a band, and a program for controlling the server, and a storage medium storing the program.

To attain the above object, in a first aspect of the present invention, there is provided a player information-providing method of providing information of a player from a server to an information access terminal device via a network, comprising the steps of storing in the server a result of a judgment made on a performance skill level of the player by a performance skill level-judging device for judging a player's performance skill level, and transmitting the result of the judgment made on the performance skill level of the player, the result being stored in the server, to the information access terminal device via the network in response to access of the information access terminal device to the server via the network.

According to this method, the result of a judgment made on each user's performance skill level by the performance skill level-judging device is stored in the server, and the result of the judgment is transmitted to an information access terminal device accessing the server. Therefore, the user of the information access terminal device can recognize results of objective judgments concerning the other users' performance skill levels and utilize the results as information for smooth organization of a band.

Preferably, the step of storing the result of the judgment in the server includes the step of storing in the server the result of the judgment transmitted from the information access terminal device to the server via the network.

According to this preferred embodiment, it is possible to enhance the speed and convenience in storing in the server a result of a judgment made on a user's performance skill level by the performance skill level-judging device.

Also preferably, the player information-providing method comprises the step of transmitting, when a chat is being held by a plurality of information access terminal devices as the information access terminal device by using the server, the result of the judgment concerning a player as a message sender of the chat from the server to the information access terminal devices participating in the chat.

According to this preferred embodiment, a user of an information access terminal device can recognize results of objective judgments concerning respective performance skill levels of the other users of information access terminal devices while having a chat with them. Therefore, the users can utilize the results of such judgments as information useful in having a chat directed to organization of a band.

More preferably, the player information-providing method comprises the step of transmitting, when an agreement notification indicating agreement to organization of a band by required members is transmitted to the server from each of the information access terminal devices of the required members during the chat, personal information of each of the required members, the personal information being stored in storage means, from the server to the information access terminal devices of the required members.

According to this preferred embodiment, when a user of an information access terminal device has a chat with other users of information access terminal devices via the server and agrees with them e.g. on organization of a band, he/she can obtain personal information (e.g. mail addresses) of each of the other members (required members) of the organized band. Therefore, the band members can utilize the personal information as information useful in making detailed arrangements for future band activities.

More preferably, the player information-providing method comprises the step of receiving, when an agreement notification indicating agreement to holding a net session by required members is transmitted to the server from each of the information access terminal devices of the required members during the chat, musical tone data transmitted from an information access terminal device of one of the required members, by the server, and then transmitting the received musical tone data from the server to information access terminal devices of remaining ones of the required members.

According to this preferred embodiment, when a user of an information access terminal device has a chat with other users of information access terminal devices via the server and agrees with them e.g. to hold a net session, he/she can transmit musical tone data of his/her own musical performance to the other band members (required members), and obtain musical tone data of a musical performance by each of the other band members at the same time. This enables the band members to play musical instruments simultaneously, i.e. perform a so-called net session.

To attain the above object, in a second aspect of the present invention, there is provided a server connected to a network, comprising a storage that stores a result of a judgment made on a performance skill level of a player by a performance skill level-judging device for judging a player's performance skill level, and a transmitter that transmits the result of the judgment made on the performance skill level of the player, the result being stored in the server, to an information access terminal device via the network in response to access of the information access terminal device to the server via the network.

According to this server, since the result of a judgment made on each user's performance skill level by the performance skill level-judging device is stored in the storage, it is possible to transmit the result of the judgment to an information access terminal device accessing the server. Therefore, the user of the information access terminal device can recognize results of objective judgments concerning the other users' performance skill levels and utilize the results as information for smooth organization of a band.

Preferably, when a chat is being held by a plurality of information access terminal devices as the information access terminal device by using the server, the transmitter transmits the result of the judgment concerning a player as a message sender of the chat to the information access terminal devices participating in the chat.

More preferably, when an agreement notification indicating agreement to organization of a band by required members is transmitted from each of the information access terminal devices of the required members during the chat, the transmitter transmits personal information of each of the required members to the information access terminal devices of the required members.

More preferably, the server further comprises a receiver for receiving, when a notification of agreement indicating agreement to holding a net session by required members is transmitted from each of the information access terminal devices of the required members during the chat, musical tone data transmitted from an information access terminal device of one of the required members, and the transmitter transmits the received musical tone data to information access terminal devices of remaining ones of the required members.

To attain the above object, in a third aspect of the present invention, there is provided a program executed by a computer, for controlling a server connected to a network and including a storage, the program comprising a storage module for causing a result of a judgment made on a performance skill level of a player by a performance skill level-judging device for judging a player's performance skill level to be stored in a predetermined area in the storage, and a control module operable when an information access terminal device accesses the server via the network, for causing the result of the judgment made on the performance skill level of the player, the result being stored in the server, to be transmitted to the information access terminal device via the network.

By using the program, it is possible to store the result of a judgment made on each user's performance skill level by the performance skill level-judging device in the storage, and transmit the result of the judgment to an information access terminal device accessing the server. Therefore, the user of the information access terminal device can recognize results of objective judgments concerning the other users' performance skill levels and utilize the results as information for smooth organization of a band.

Preferably, the program includes a transmitter module operable when a chat is being held by a plurality of information access terminal devices as the information access terminal device by using the server, for causing the result of the judgment concerning a player as a message sender of the chat to be transmitted to the information access terminal devices participating in the chat.

To attain the above object, in a fourth aspect of the present invention, there is provided a computer-readable storage medium storing a program for controlling a server connected to a network and including a storage, the program comprising a storage module for causing a result of a judgment made on a performance skill level of a player by a performance skill level-judging device for judging a player's performance skill level to be stored in a predetermined area in the storage, and a control module operable when an information access terminal device accesses the server via the network, for causing the result of the judgment made on the performance skill level of the player, the result being stored in the server, to be transmitted to the information access terminal device via the network.

Preferably, the program comprises a transmitter module operable when a chat is being held by a plurality of information access terminal devices as the information access terminal device by using the server, for causing the result of the judgment concerning a player as a message sender of the chat to be transmitted to the information access terminal devices participating in the chat.

The above and other objects, features, and advantages of the present invention will become more apparent from the following detailed description taken in conjunction with the accompanying drawings.

BRIEF DESCRIPTION OF THE DRAWINGS

FIG. 4 is a diagram schematically illustrating contents of a user database stored in an HDD of the server;

FIG. 5 is a diagram schematically illustrating contents of a chat room database stored in the HDD of the server;

FIG. 6 is a diagram schematically illustrating contents of a session room database stored in the HDD of the server;

FIG. 12 is a diagram schematically illustrating data contents stored in an HDD of the user terminal device during generation of the performance skill level data;

FIG. 27 is a diagram useful in explaining a variation of the embodiment; and FIG. 28 is a diagram showing an example of a chat room screen displayed in another variation of the embodiment.

DETAILED DESCRIPTION OF THE PREFERRED EMBODIMENTS

The present invention will now be described in detail with reference to the drawings showing a preferred embodiment thereof.

Figure 1:
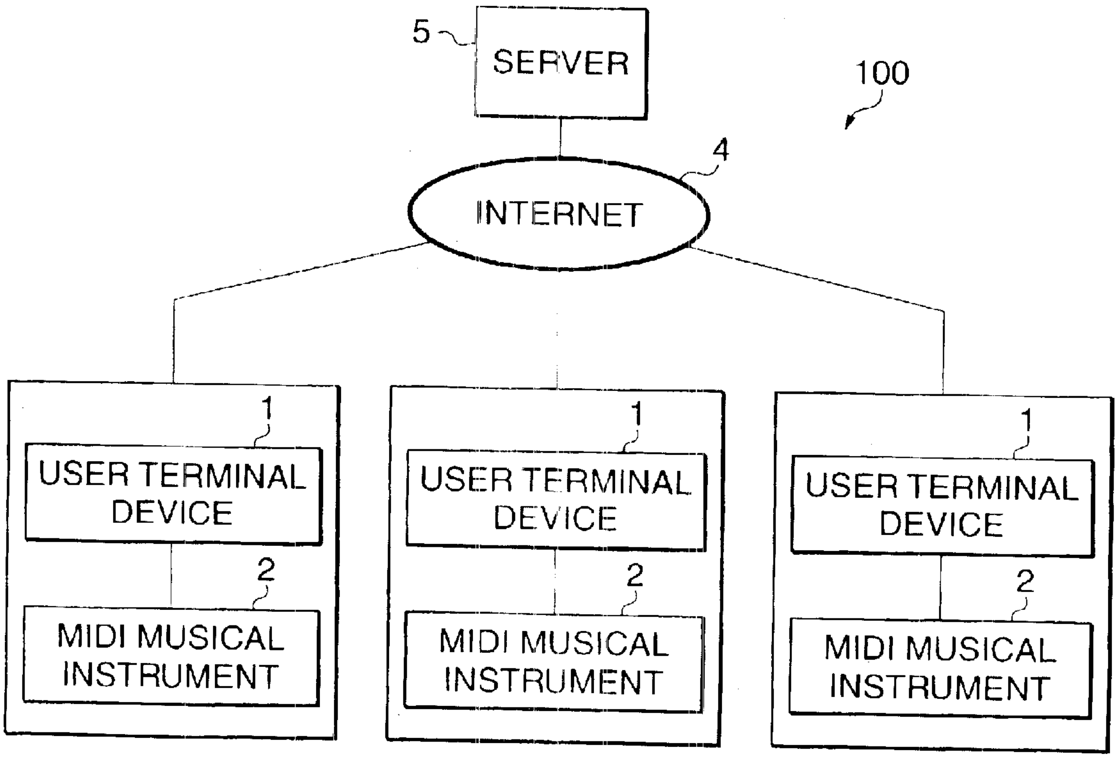
FIG. 1 is a block diagram schematically showing the arrangement of a band organization support system according to an embodiment of the present invention.

Referring first to FIG. 1, there is shown the arrangement of a band organization support system (hereinafter simply referred to as "the system") 100.

As shown in the figure, the system 100 is comprised of user terminal devices 1, the Internet 4, and a server 5. Each of the user terminal devices 1 has a MIDI (Musical Instrument Digital Interface) musical instrument 2 connected thereto. Actually, there may be more user terminal devices 1 and MIDI musical instruments 2 than shown in FIG. 1.

The user terminal devices 1 are each implemented e.g. by a personal computer or a PDC (Personal Digital Cellular), and connected to the Internet 4, for performing transmission and reception of data with the server 5 also connected to the Internet 4. Further, the MIDI musical instruments 2, such as an electronic piano and an electronic drum, are connected to the user terminal devices 1, respectively.

Each of the MIDI musical instruments 2 has the same functions that a musical instrument, such as a conventional electronic piano, has, as well as a function of generating and delivering a MIDI signal based on information of a performance given by a user in real time.

Figure 2:
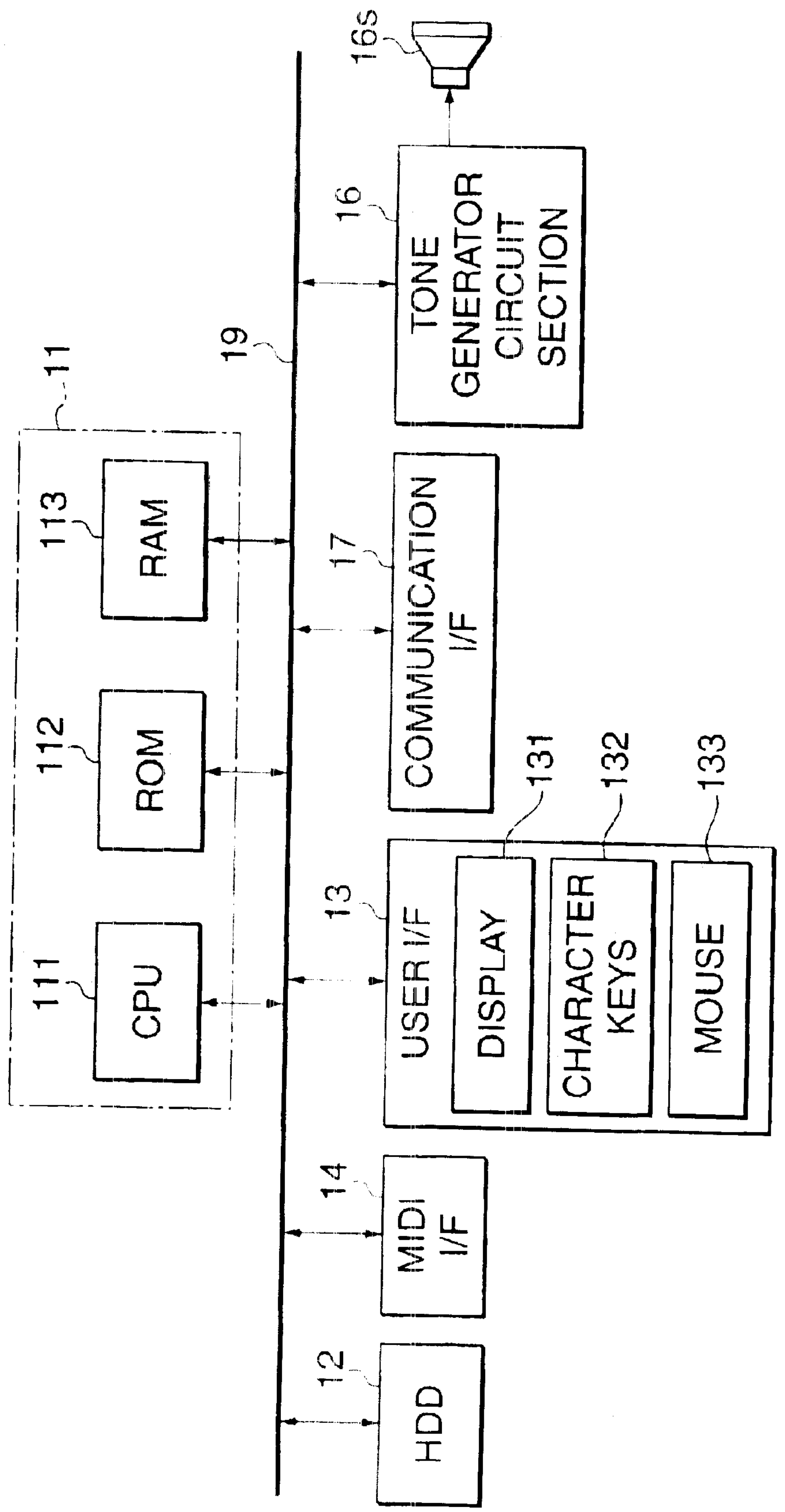
FIG. 2 is a block diagram schematically showing the arrangement of a user terminal device of the FIG. 1 system.

FIG. 2 is a block diagram showing the arrangement of a user terminal device 1. As shown in the figure, the user terminal device 1 is comprised of a control section 11, an HDD (Hard Disk Drive) 12, a user interface 13, a MIDI interface 14, a tone generator circuit section 16, and a communication interface 17, all of which are connected to each other by a bus line 19. Further, a speaker 16*s* is connected to the tone generator circuit section 16.

The control section 11 is comprised of a CPU 111, a ROM (Read Only Memory) 112, and a RAM (Random Access Memory) 113, and controls the overall operation of the user terminal device 1. The ROM 112 stores various programs including e.g. a set of control programs for displaying received HTML (Hyper Text Markup Language) data on a display 131. The RAM 113 is used as a working area by the CPU 111.

The user interface 13 is comprised of the display 131 for displaying various kinds of information, character keys 132 for use in input operation by a user, and a mouse 133. The HDD 12 stores various data and programs transmitted from the server 5. Further, a dedicated program for making use of the system 100 is also installed in the HDD 12.

The tone generator circuit section 16, under control of the control section 11, generates a musical tone signal based on predetermined musical tone data. In the system 100, since musical tone data is MIDI data, the tone generator circuit section 16 functions as a MIDI tone generator. The tone generator circuit section 16 generates a musical tone signal based on received MIDI data and then outputs the musical tone signal to the speaker 16*s*. The speaker 16*s* outputs musical tones based on the musical tone signal.

Figure 3:
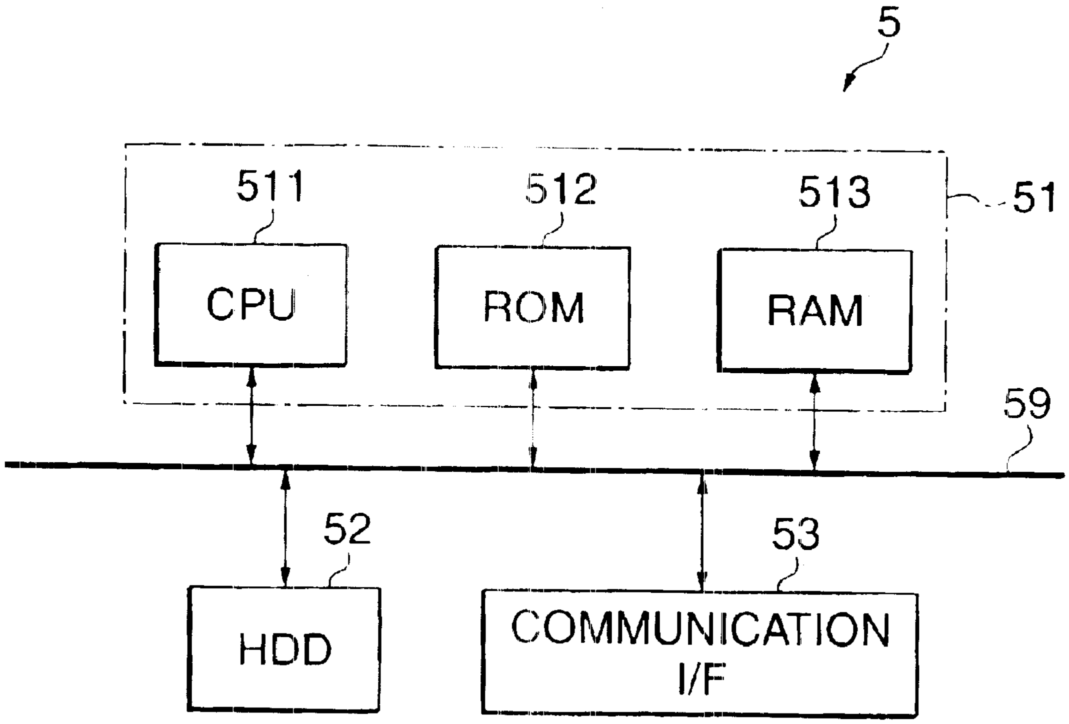
FIG. 3 is a block diagram schematically showing the arrangement of a server of the FIG. 1 system.

Next, the arrangement of the server 5 will be described with reference to FIG. 3. As shown in the figure, the server 5 is comprised of a control section 51, an HDD 52, and a communication interface section 53, all of which are connected to each other by a bus line 59.

The control section 51 is comprised of a CPU 511, a ROM 512, and a RAM 513, and controls the overall operation of the server 5. The ROM 512 stores predetermined programs, etc., while the RAM 513 is used as a working area by the CPU 511.

The HDD 52 stores in advance an execution program and the like for providing various services of the system 100 to users via the respective user terminal devices 1. Further, in the HDD 52, there are prepared in advance a database area for storing various data (performance skill level data and the like) transmitted from the user terminal devices 1, an area which is used as a working area when a chat system is provided to users, and an area which is used as a working area for receiving and transmitting musical tone data (i.e. for a net session) between user terminal devices 1 via the Internet 4. In the following, contents of the HDD 52 will be described in detail.

Web (World Wide Web) Page

A web page is prepared as an access destination for users who utilize the system 100. It should be noted that access to this page is under password control. Each password is notified beforehand to a corresponding user who has signed up for utilization of services provided by the system 100 and paid a predetermined charge.

User Database

The user database is used for managing performance skill level data indicative of each user's performance skill level in playing a musical instrument. FIG. 4 schematically illustrates the contents of the user database. As shown in the figure, the user database stores user ID's for identifying users, names of musical instruments played by the users, data (performance skill level data) indicative of the users' musical performance skill levels, and pieces of personal information (e.g. mail addresses), in a state correlated with each other. A user ID is identification information generated by assigning a number to a user before the user is allowed to utilize the present system 100. Personal information (e.g. a mail address) of the user is transmitted from the user terminal device 1 when the user signs up for utilization of the services provided by the system 100.

Chat Room Database

The chat room database is used for managing individual chat rooms. FIG. 5 schematically illustrates the contents of the chat room database. As shown in the figure, the chat room database stores the names of the chat rooms, and pieces of information (including performance skill level data) of users each currently accessing (staying in) a corresponding chat room in a state correlated with each other.

Session Room Database

The session room database is used for managing individual session rooms. FIG. 6 schematically illustrates an example of the contents of the session room database. As shown in the figure, the session room database stores the names of the session rooms, pieces of information (including performance skill level data) of users each currently accessing (staying in) a corresponding session room, and information indicative of the present state of each session room (e.g. information indicating that a session is being held) in a state correlated with each other.

The above is a description of the components of the system 100.

The following is a detailed description of operations of the system 100.

Figure 7:
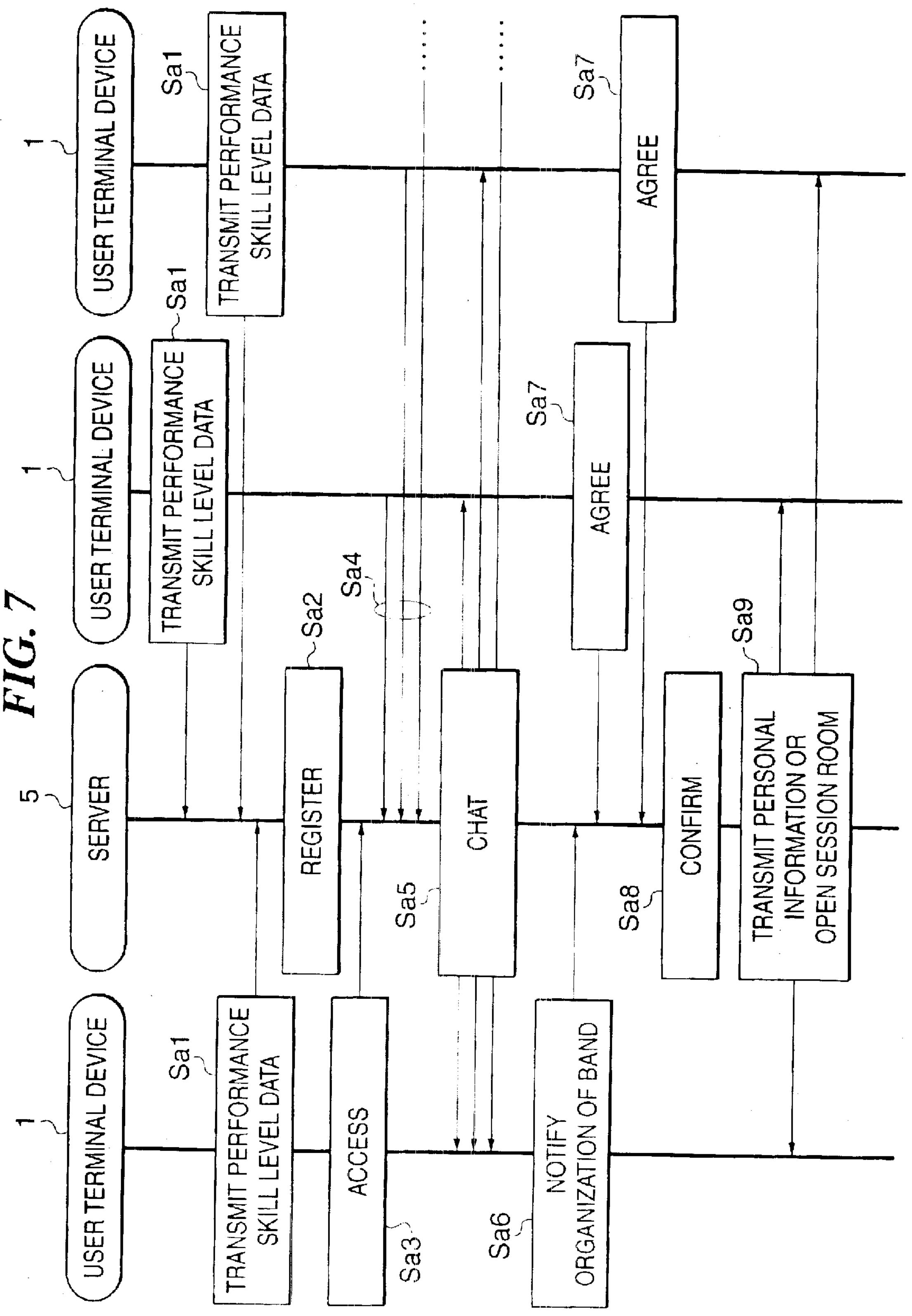
FIG. 7 is a sequence chart useful in explaining the outline of operations of the FIG. 1 system.

First, the outline of processes executed by the system 100 for providing various services to users will be described by referring to a sequence chart shown in FIG. 7, and then details of each process will be described.

Users looking for band members each register information (performance skill level data) indicative of his/her own performance skill level in the server 5 by using his/her user terminal device 1 (step Sa1). The performance skill level data is generated by using a predetermined program, described hereinafter, for objective judgment of the performance skill level of a user.

On the other hand, the server 5 stores the performance skill level data transmitted from each of the user terminal devices 1 (step Sa2).

Then, each of the users having registered the performance skill level data accesses one of the chat rooms in the server 5 by using the user terminal device 1 (step Sa3). The chat rooms are prepared as access destinations for users looking for band members, and include various chat rooms corresponding to respective music genres, such as rock and jazz. Each user accesses a favorite chat room, where users interested in the same music genre gather (step Sa4), so that users in each chat room can have an efficient chat directed to organization of a band (step Sa5).

Now, the present system 100 is characterized by providing control such that not only messages of a chat (conversation) but also the performance skill level (represented by performance skill level data) of each message sender of the chat are displayed simultaneously on a chat screen. This enables each user to grasp the other users' performance skills exactly and then have a chat directed to organization of a band. Therefore, differently from the conventional methods, the present system 100 makes it possible to prevent occurrence of the problem that differences in performance skill level among band members are recognized after the start of actual band activities, only to make the band activities unenjoyable.

When the users reach an agreement on organization of the band through the chat, one of the users notifies the server 5 of the result (step Sa6: notification of band organization). After agreement (step Sa7) of the other band members (users) to the organization of the band is confirmed (step Sa8), the server 5 transmits pieces of personal information (including mail addresses) of the band members to each of the user terminal devices 1 (step Sa9). Thereafter, the users having agreed to the organization of the band can make detailed arrangements for future band activities.

Further, it is possible to have a net session by utilizing the system 100. In this case, the server 5 opens a session room (step Sa9), and carries out control operation for transmission and reception of musical tone data between the band members via the Internet 4 to thereby realize a net session.

As described above, according to the system 100, it is possible to realize supports for organization of a band, or more specifically, provision of a cat room for users looking for band members, and provision of a session room for users having organized a band.

In the following, a detailed description will be given of several operations characterizing the present system 100.

Generation of Performance Skill Level Data

The most characteristic features of the system 100 consist in that each of users utilizing the system 100 generates performance skill level data indicative of a level of his/her own performance skill in playing a musical instrument, and registers the generated data in the server 5, by using his/her user terminal device 1, and that the users can have a chat directed to organization of a band after having grasped each other's performance skill level.

A judgment program for generating the performance skill level data is installed in advance in the user terminal device 1 (HDD 12) of each of the users utilizing the system 100, so that the users each use the same judgment program to generate the performance skill level data indicative of his/her own level of performance skill in playing a musical instrument. This makes it possible to judge each user's performance skill level objectively.

Figure 8:
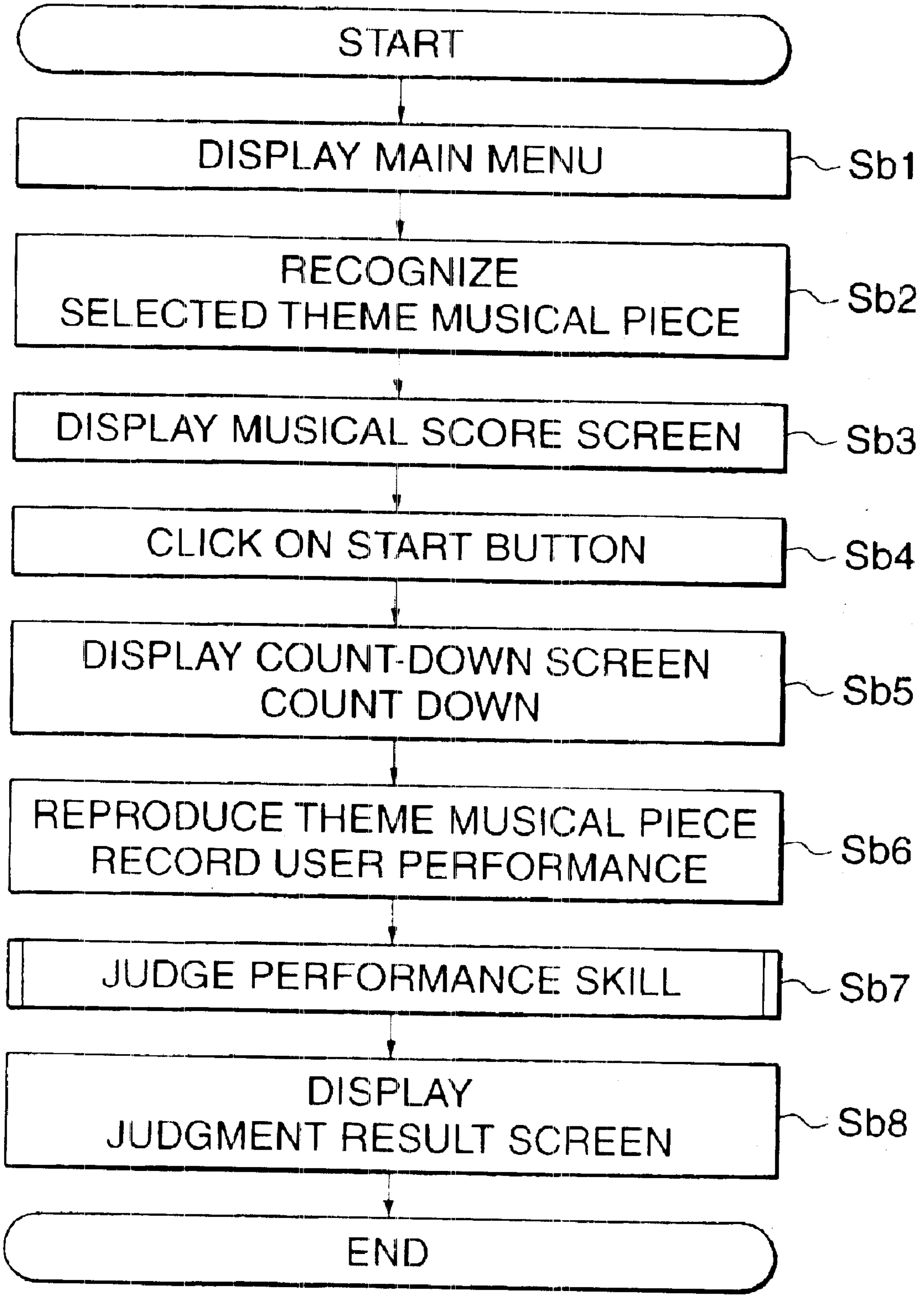
FIG. 8 is a flowchart of control operations executed by a control section of the user terminal device, for generation of performance skill level data.

FIG. 8 is a flowchart showing control operations executed by the control section 11, when performance skill level data is generated in the user terminal device 1.

Figure 9:
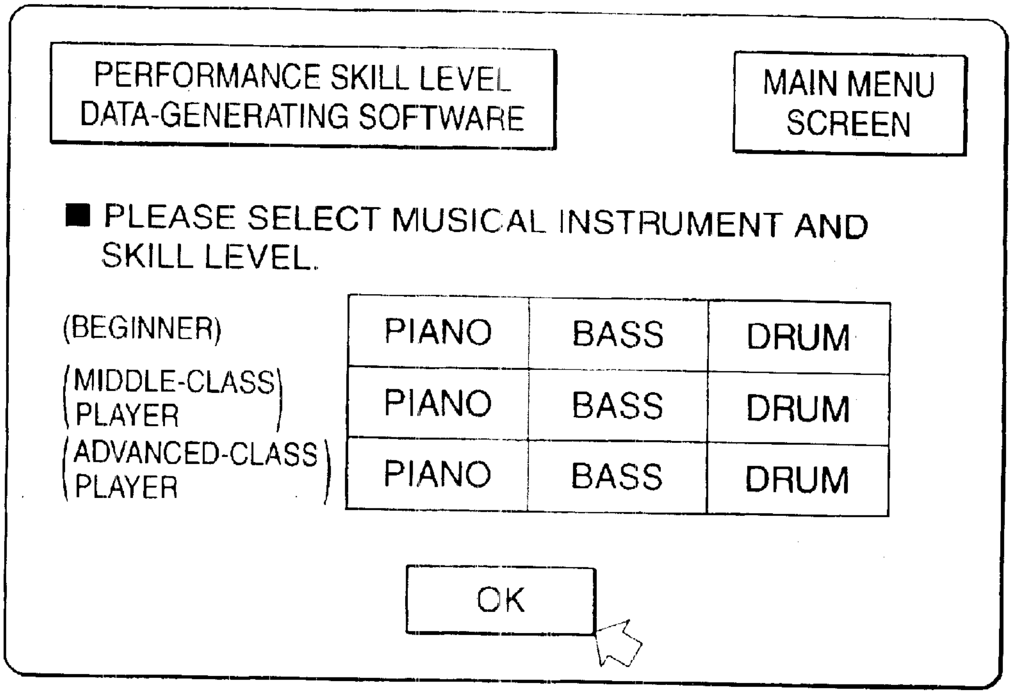
FIG. 9 is a diagram showing an example of a main menu screen displayed on a display of the user terminal device during generation of the performance skill level data.

First, the control section 11 causes a main menu screen, shown in FIG. 9 by way of example, to be displayed on the display 131 (step Sb1).

As shown in FIG. 9, on the main menu screen, menu options are displayed for prompting a user to select a musical instrument and a level of a musical piece. Although in the present example, three kinds of musical instruments, i.e. the piano, the bass, and the drum, and three levels, i.e. a beginner's level, a middle level, and an advanced level, are provided for selection therefrom, other musical instruments and levels may be added to the menu options.

A user selects a desired musical instrument and a desired level by using the character keys 132 and the mouse 133 while viewing the main menu screen. For instance, a user (piano beginner) who has just started taking lessons on the piano selects the beginner's level on the main menu screen shown in FIG. 9 and clicks on a software button bearing the name "piano". Then, the user clicks on a software button "OK" at the bottom of the screen to finally set his selection.

Figure 10:
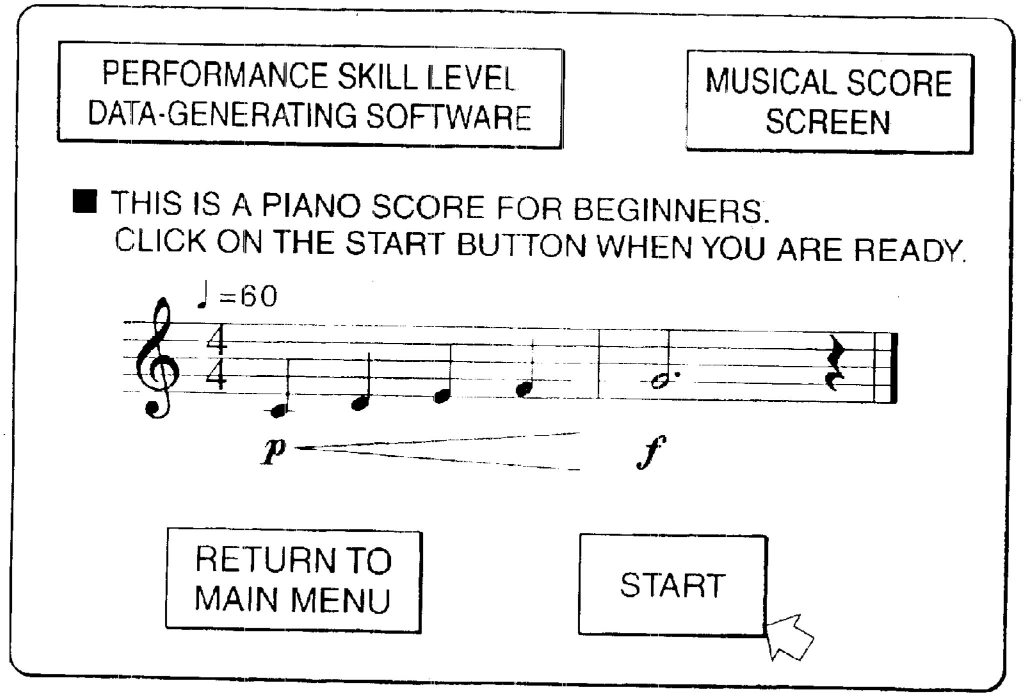
FIG. 10 is a diagram showing an example of a musical score screen displayed on the display of the user terminal device during generation of the performance skill level data.

After discriminating the selection (FIG. 8: step Sb2), the control section 11 causes a musical score screen, shown in FIG. 10 by way of example, to be displayed on the display 131 (FIG. 8: step Sb3).

As shown in FIG. 10, on the musical score screen, there is displayed a musical score of a theme musical piece for performance on the musical instrument selected by the user. The data of musical scores is stored in the HDD 12 in advance.

The user can recognize details of the musical score to be played by him/her, based on the contents of the musical score screen. In the illustrated example, a musical score for a piano beginner's performance is displayed. If the user plays faithfully to the musical score, it is judged that the user's performance skill level is high, whereas if not, it is judged that the user's performance skill level is low.

It should be noted that in the judgment process, a selected musical score may be displayed on the display 131 as above, or alternatively, musical scores printed on paper may be distributed to users to allow each user to play while viewing a selected one of the musical scores.

Now, the user ready to play the MIDI musical instrument 2 clicks on a software button "Start" on the FIG. 10 musical score screen (FIG. 8: step Sb4).

Responsive to the clicking, the control section 11 causes a count-down display screen to be displayed on the display 113 and executes a count-down process (step Sb5).

The count-down process is executed so as to enable the user ready to play the MIDI musical instrument 2 to start a musical performance smoothly.

Figure 11:
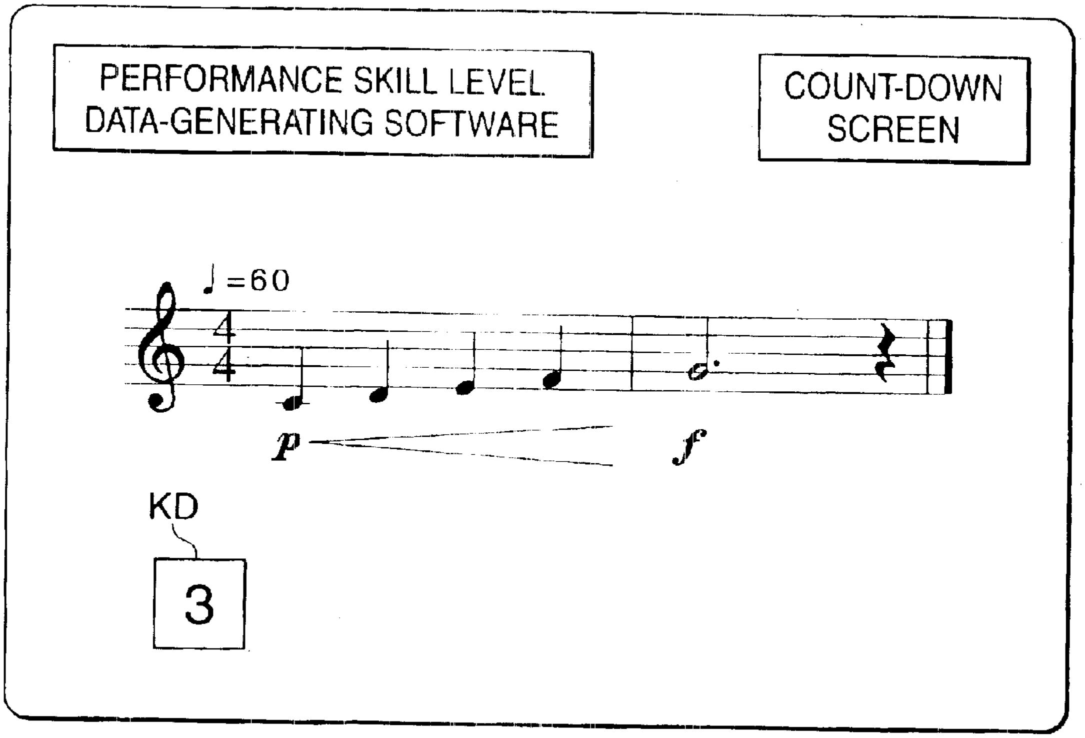
FIG. 11 is a diagram showing an example of a count-down display screen displayed on the display of the user terminal device during generation of the performance skill level data.

As shown in FIG. 11, on the count-down display screen, count-down information KD is displayed in addition to information of the musical score to be played by the user. The control section 11 causes count-down musical tones (e.g. metronome tones) data of which is provided in advance to be sounded for count down through the speaker 16*s*, and at the same time executes displayed information-switching control to change the count-down information KD in the order of "3"→"2"→"1"→ "Start" to the count down by the count-down musical tones.

The tempo of the sounding of the count-down musical tones and the interval of switching of displayed information are controlled to coincide with the tempo of a musical piece to be played. Therefore, the user can measure timing for starting the musical performance and recognize the tempo of the musical performance, by the count-down musical tones and the display of the count-down information KD.

In a manner continued from the count-down process, the control section 11 actually starts reproduction of MIDI data of the theme musical piece. musical piece data used in the system 100 is formed in the same data format as that of conventional MIDI data, and comprised of part data items for respective musical instrument parts (in the illustrated example, three parts, i.e. a piano part, a bass part and a drum part).

In the illustrated example, the user plays the piano part, and hence the control section 11 provides control such that only musical tones of the bass and drum parts other than the piano part are output through the speaker 16*s*. In short, the control section 11 performs a "Music Minus One" performance without a piano performance. The user plays the MIDI musical instrument 2 (electronic piano in the present example) while listening to the "Music Minus One" performance. Since reproduced musical tones are output through the speaker 16*s*, the user plays the MIDI musical instrument 2, based on the musical score displayed on the display 131, while listening to the musical tones being output through the speaker 16*s* in a manner continued from the count-down.

It should be noted that although in reproduction of ordinary MIDI data, a user is allowed to set a reproducing speed and a tone pitch as the user desires, in the present software, only reproduction at a predetermined speed and a predetermined pitch is permitted so as to prevent a user from preparing faked performance skill level data.

Data of the above musical performance by the user is sent from the MIDI musical instrument 2 to the user terminal device 1, as MIDI data, and stored in the HDD 12 of the user terminal device 1. Then, after completion of the musical performance, the control section 11 performs a comparison between the MIDI data (user performance data) of the musical performance by the user and the MIDI data (ideal performance data) of the piano part muted during the "Music Minus One" performance, to thereby make a judgment on the user's performance skill, based on how close to the ideal performance the user played his/her performance.

FIG. 12 schematically shows relevant items of the user performance data and those of the ideal performance data in contrast. More specifically, FIG. 12 shows that the user depressed a key of musical tone G4 in timing Tm11 (note-on event) and stopped depressing the key in timing Tm12 (note-off event). Further, the figure shows that subsequently, the user depressed a key of musical tone G4 in timing Tm13 (note-on event) and stopped depressing the key in timing Tm14 (note-off event).

It should be noted that ordinary MIDI data contains information indicative of the sounding length (duration) of each musical tone, and hence the information of duration may be used as judgment criteria. Alternatively, the information may be converted, after completion of a user's performance, to timing information obtained with a time point of termination of the count-down time set as a reference point (0 second), and the timing information may be used as a judgment reference.

The control section 11 makes the comparison between the user performance data and the ideal performance data to recognize matches and mismatches therebetween. Then, when a mismatch is recognized, determination is made as to how large the mismatch is. The determination can be made by any suitable method. For instance, it can be made based on whether wrong tones are sounded (the user depressed wrong keys) or whether there were any mismatches in sounding timing. Further, the user's performance skill is rated on a scale of 30 points, based on predetermined marking rules set such that one point is deducted whenever a wrong musical tone is sounded, and 0.5 point is deducted when a deviation in timing exceeds 0.5 second, for instance.

The control section 11 of the user terminal device 1 which has judged the user's performance skill level as described above causes a judgment result screen to be displayed on the display 131 (FIG. 8: step Sb8).

Figure 13:
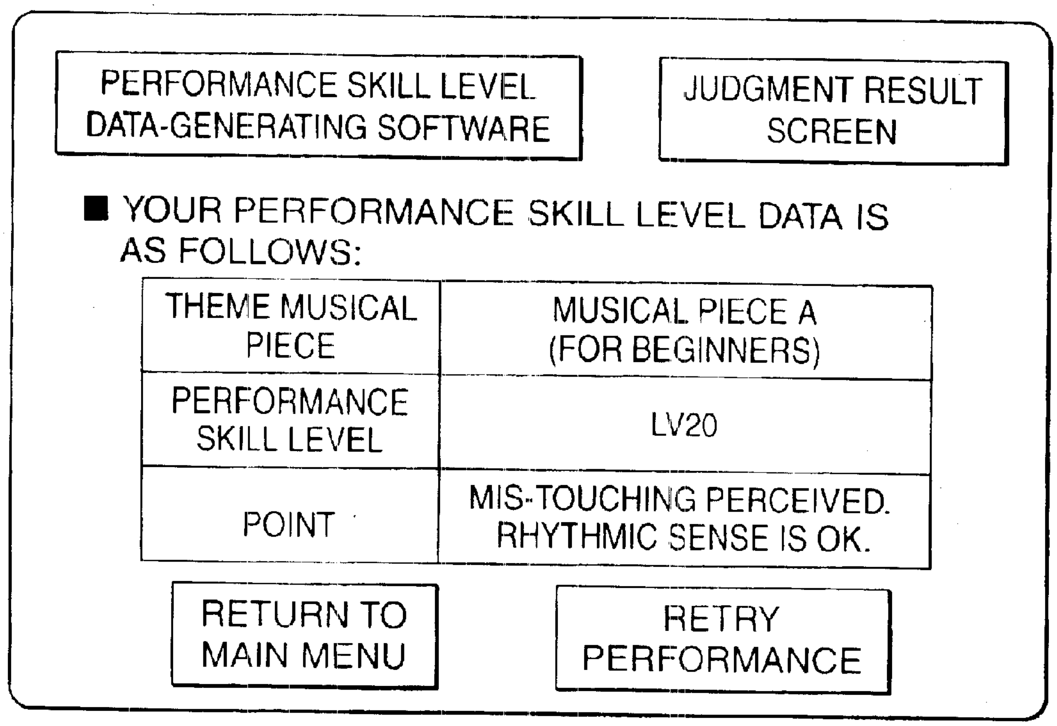
FIG. 13 is a diagram showing an example of a judgment result screen displayed on the display of the user terminal device during generation of the performance skill level data.

FIG. 13 illustrates the contents of the judgment result screen. On the screen, the performance skill level data indicative of the user's performance skill level judged according to the predetermined marking rules is displayed in a concretive manner.

It should be noted that on the judgment result screen, an evaluation comment characterizing a musical performance by a user is displayed together with the judgment result. If a plurality of evaluation comments are prepared in advance, and one corresponding to a user's musical performance is displayed as in the illustrated example, this is advantageous in that the user can analyze his/her own musical performance and then determine a plan and the like for practicing the musical instrument.

Further, the control section 11 stores the performance skill level data, shown in FIG. 13 by way of example, as a predetermined encoded file so as to prevent the user from tampering the data.

A user who is not satisfied with a result of judgment can retry a musical instrument performance. In this case, when the user clicks on a software button "Retry Performance" on the FIG. 13 judgment result screen, the control section 11 executes control processing for switching the judgment result screen back to the FIG. 11 count-down screen, so that the count down is performed again for reproduction of the "Music Minus One" performance. Thus, the user is allowed to demand performance skill judgment over and over again until he feels the judgment is acceptable.

The above are the operations carried out by the user terminal device 1 for generation of the performance skill level data.

Registration of Performance Skill Level Data

Next, a description will be given of operations for registering the performance skill level data generated as described above, in the server 5.

Figure 14:
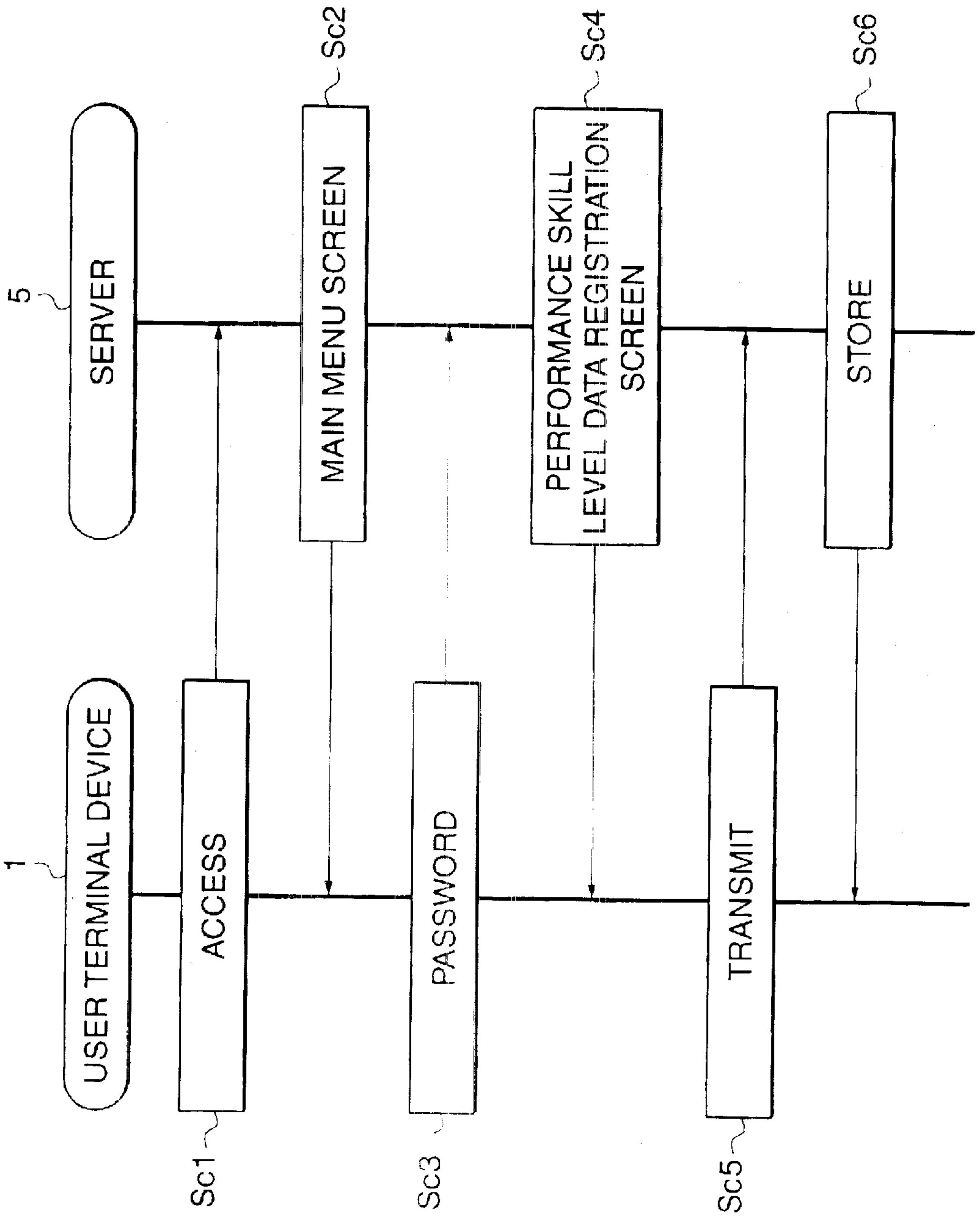
FIG. 14 is a sequence chart useful in explaining operations carried out by the user terminal device and the server, for registration of the performance skill level data.

FIG. 14 is a sequence chart showing a procedure of registering the performance skill level data in the server 5.

Figure 15:
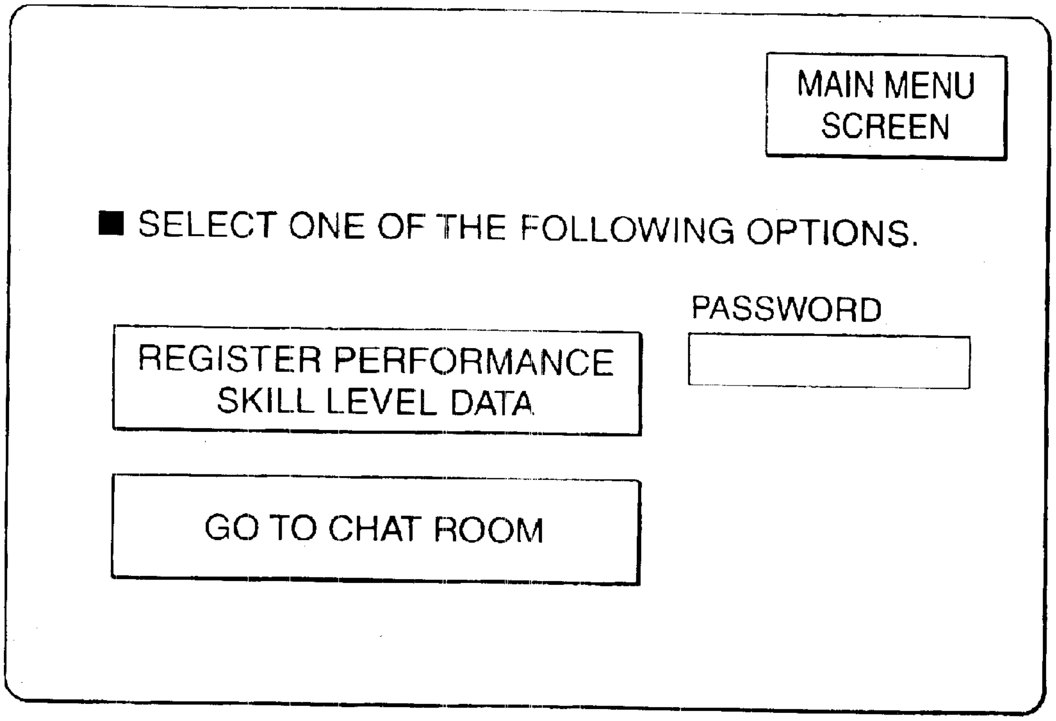
FIG. 15 is a diagram illustrating an example of a main menu screen displayed on the display of the user terminal device during registration of the performance skill level data.

When the user carries out a predetermined operation to cause the user terminal device 1 to access the server 5 via the Internet 4 (step Sc1), the server 5 causes the user terminal device 1 to display a main menu screen, shown in FIG. 15 by way of example, on the display 131 (step Sc2).

As shown in FIG. 15, on the main menu screen, options are displayed for prompting the user to select between registration of the performance skill level data and access to a chat room.

The user intending to register the performance skill level data operates the mouse 133, enters a password on the FIG. 15 main menu screen, and then clicks on a software button bearing "Register Performance Skill Level Data". Responsive to this operation, the control section 11 of the user terminal device 1 transmits a signal representative of these operations to the server 5 via the Internet 4 (FIG. 14: step Sc3). A password is information necessitated in receiving services by the system 100, and hence each user is informed of his/her own password on condition of payment of a charge for utilization of the system, in advance.

Figure 16:
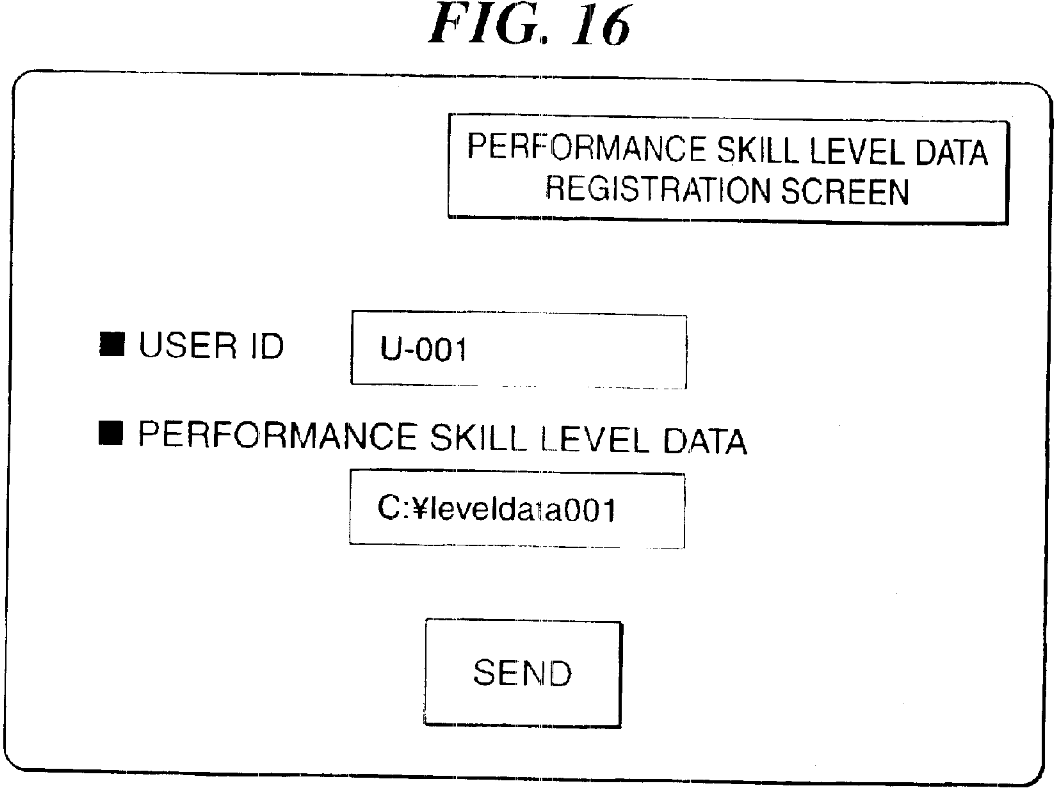
FIG. 16 is a diagram showing an example of a performance skill level data registration screen displayed on the display of the user terminal device, during registration of the performance skill level data.

When the entered password is valid, the server 5 transmits HTML data to the user terminal device 1, and causes the user terminal device 1 to display a performance skill level data registration screen shown in FIG. 16 on the display 131 (FIG. 14: step Sc4).

The user views items displayed on the FIG. 16 performance skill level data registration screen and enters respective pieces of information for the items by using the character keys 132 and the mouse 133. More specifically, the user enters information designating a directory storing an encoded data file of the performance skill level data in an entry box for performance skill level data. A user ID is information necessary for identifying a user about to utilize the system 100, and hence each user is informed of his/her own user ID in advance.

After entering necessary information to the predetermined items on the performance skill level data registration screen, the user clicks on a software button "Send". Responsive to this operation, the control section 11 transmits the information of the entered user ID and the encoded data file read out from the designated directory to the server 5 via the Internet 4 (FIG. 14: step Sc5). The server 5 decodes the received encoded data file to thereby discriminate contents of the performance skill level data, and then stores the contents in a record of the user database in the HDD 52 corresponding to the user ID (FIG. 14: step Sc6).

The above are the operations performed for registration of the user's performance skill level data.

Operations in a Chat Room

Figure 17:
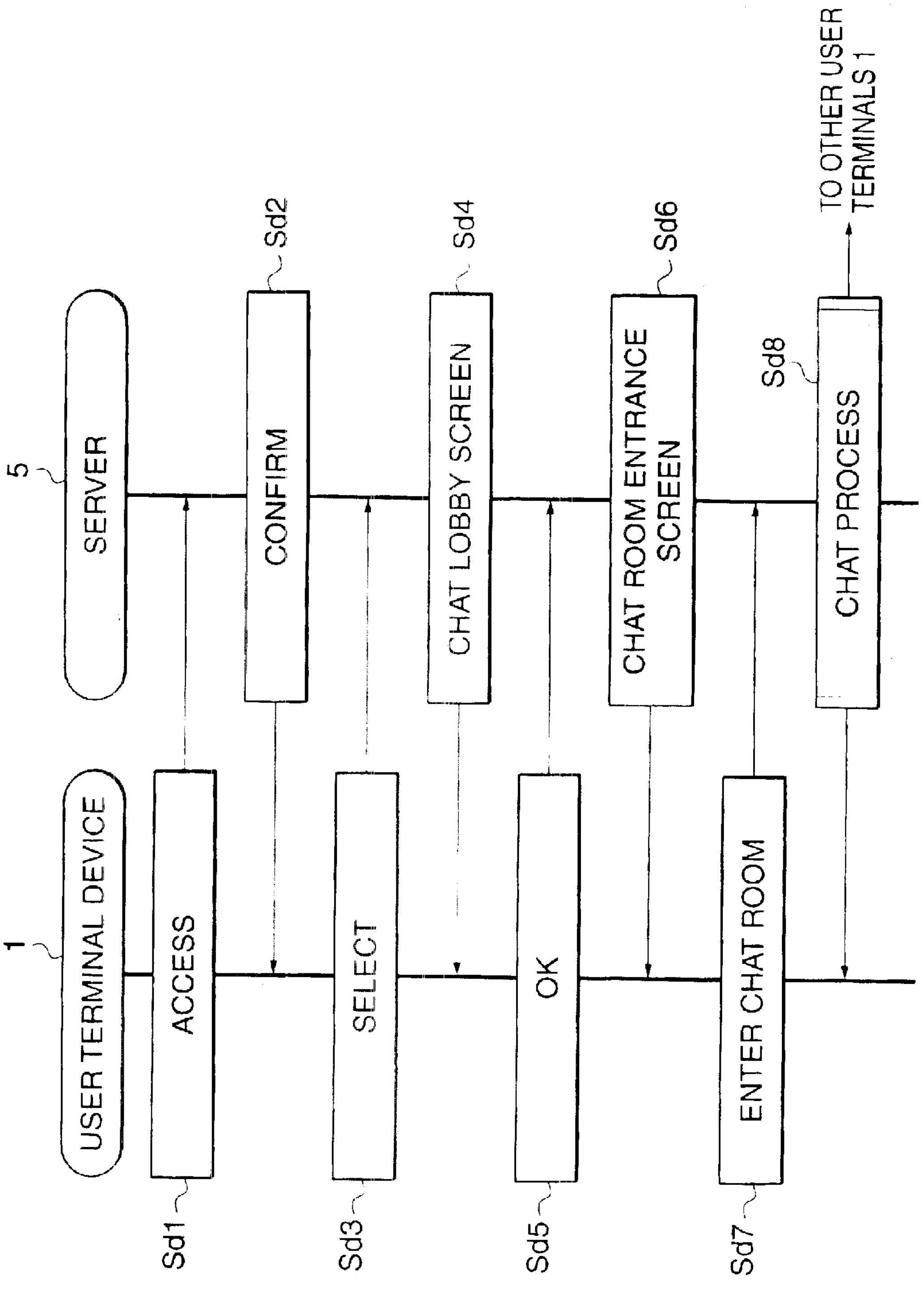
FIG. 17 is a sequence chart useful in explaining operations carried out by the user terminal device and the server when a user of the user terminal device enters a chat room.

Next, a description will be given of operations carried out when a user accesses a chat room to look for band members to organize a band after registration of user's performance skill level data. FIG. 17 is a sequence chart showing a sequence of such operations.

When the user carries out a predetermined operation to cause the user terminal device 1 to access the server 5 via the Internet 4 (step Sd1), the server 5 transmits HTML data to the user terminal device 1 and causes the user terminal device 1 to display the FIG. 15 main menu screen on the display 131 (FIG. 17: step Sd2).

The user operates the mouse 133 to click on a software button "Go to Chat Room" on the FIG. 15 main menu screen so as to enter a chat room. Responsive to this operation, the control section 11 of the user terminal device 1 transmits a signal corresponding to this operation to the server 5 (FIG. 17: step Sd3).

Figure 18:
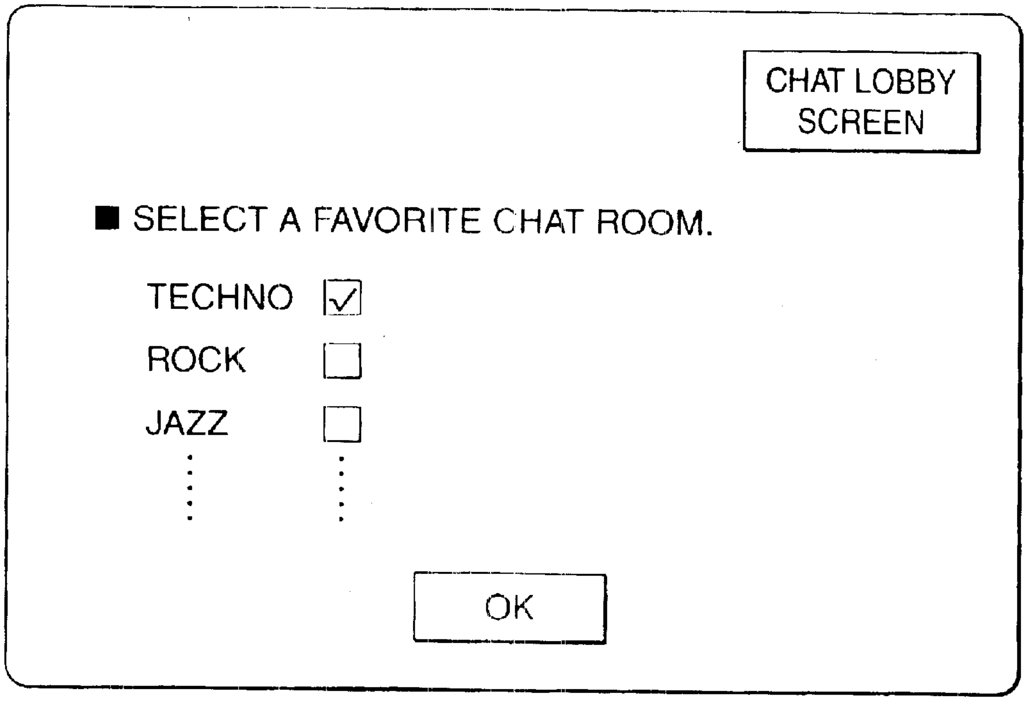
FIG. 18 is a diagram showing an example of a chat lobby screen displayed on the display of the user terminal device when the user enters the chat room.

On the other hand, the server 5, having received the signal, transmits HTML data to the user terminal device 1, together with a control signal for causing the user terminal device 1 to display a chat lobby screen, shown in FIG. 18 by way of example, on the display 131 (step Sd4)

In the system 100, there are provided chat rooms corresponding to respective music genres, and hence the chat rooms represented by names of genres are displayed on the chat lobby screen.

The user selects a chat room corresponding to his/her favorite music genre from the chat rooms displayed on the FIG. 18 chat lobby screen, and then clicks on a software button "OK". The control section 11 of the user terminal device 1 sends a chat participation request including the selected chat room to the server 5 (FIG. 17: step Sd5).

It should be noted that although in FIG. 18, the chat rooms corresponding to the respective three music genres, i.e. techno, rock, and jazz, are provided, chat rooms corresponding to other different music genres may be added to the three chat rooms. Further, the music genre of e.g. techno may be subdivided (e.g. into classifications, such as the advanced level, the middle level, and so forth), and chat rooms may be provided for the classifications, respectively.

Figure 19:
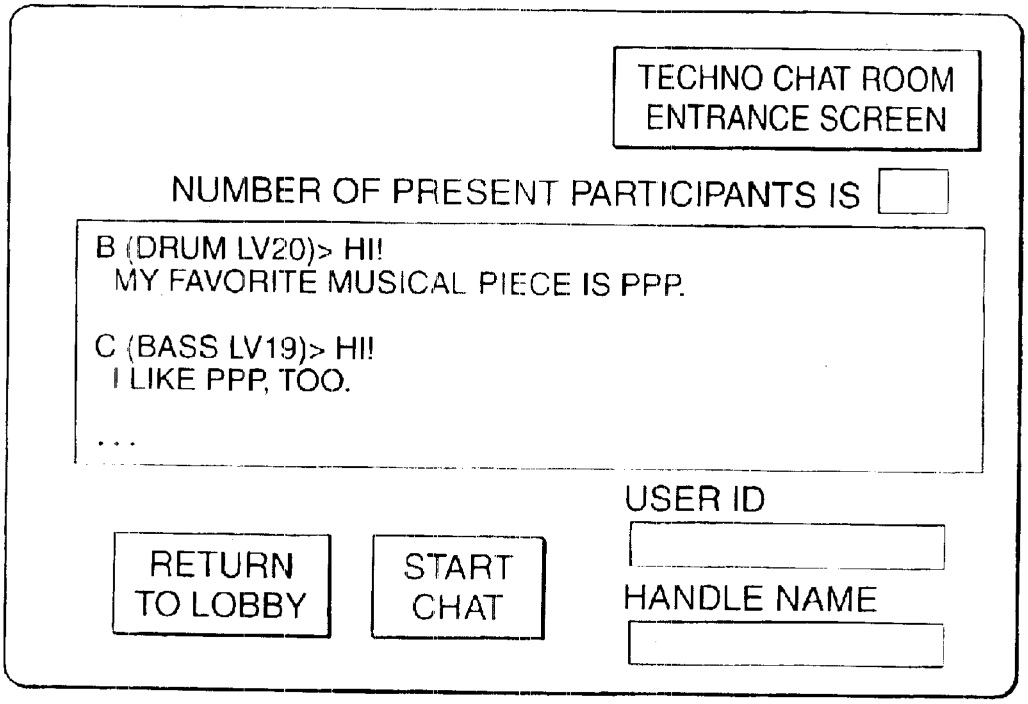
FIG. 19 is a diagram showing an example of a techno chat room entrance screen displayed on the display of the user terminal device before the user enters the chat room.

When receiving the chat participation request from the user terminal device 1, the server 5 transmits HTML data to the user terminal device 1 and causes the user terminal device 1 to display a chat room entrance screen, shown in FIG. 19 by way of example, on the display 131 (step Sd7).

As shown in FIG. 19, on the chat room entrance screen, there are displayed the number of users as present participants in the chat, and the messages (chat history information) of the chat being currently held. These contents of this screen are managed by a chat database in the HDD 52 of the server 5 such that they are transmitted to each user terminal device 1 from the server 5 as occasion demands. The contents described above are similar to those of general chat rooms.

The user having decided to participate in the chat room enters his/her user ID and handle name on the FIG. 19 chat room entrance screen (in the illustrated example, the user ID is "U-001", and the handle name "Mr. A"), and then clicks on a software button "Start Chat". Responsive to this operation by the user, the control section 11 of the user terminal device 1 notifies the server 5 that the user wants to participate in the chat (FIG. 17: step Sd7).

When receiving the notification, the control section 51 of the server 5 checks if the performance skill level data corresponding to the user ID has been registered in the user database in the HDD 52, and then performs control processing for treating the user as a new chat participant having the handle name "Mr. A". It should be noted that when the user's performance skill level data is not registered in the user database in the HDD 52, the control section 51 of the server 5 stops the above control processing immediately and causes the user terminal device 1 to display a comment saying "Please register your performance skill level data." in a pop-up fashion.

On the other hand, if the user's performance skill level data has been registered in the user database in the HDD 52, the control section 51 of the server 5 reads out the performance skill level data corresponding to the user ID "U-011" from the user database and copies the same to the chat room database. For instance, when "Mr. A" becomes a participant in the techno chat room in addition to "Mr. B" and "Mr. C" as in the illustrated example, the control section 51 of the server 5 reads out the performance skill level data of the new participant "Mr. A" from the user database and copies the same to the chat room database (see FIG. 5).

Figure 20:
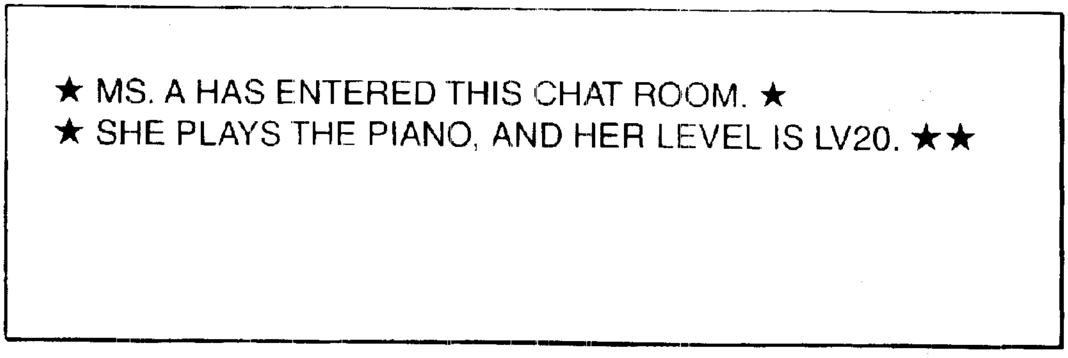
FIG. 20 is a diagram showing an example of messages displayed on the display of the user terminal device of a user staying in the chat room.

Then, the control section 51 of the server 5 transmits HTML data to the user terminal devices 1 of "Mr. B" and "Mr. C" to inform "Mr. B" and "Mr. C" of participation of "Mr. A" in the techno chat room, and causes each of the user terminal devices 1 of "Mr. B" and "Mr. C" to display contents, shown in FIG. 20 by way of example, on the display 131.

The displayed contents enable "Mr. B" and "Mr. C" not only to realize that "Mr. A" has participated in the techno chat room, but also to recognize Mr. A's musical instrument and performance skill level.

Therefore, the three users can have a chat directed to organization of a band based on recognition of each other's musical instruments and performance skill levels (FIG. 17: step Sd8).

Next, a description will be given of operations of the server 5 for controlling a user terminal device 1 currently accessing the chat room.

Whenever receiving data of a chat message from a user terminal device 1 currently accessing the chat room, the control section 51 of the server 5 stores the received data in the chat room database in the HDD 52. Then, the control section 51 transmits the chat message and the performance skill level data of a message sender to the user terminal device 1 of each of the users participating in the chat.

The control operation carried out in the present system 100 is distinguished from that in a conventional chat system in that not only chat messages but also the performance skill level data of each message sender are sent to the user terminal device 1 of each of chat participants. The control section 51 reads out performance skill level data concerning a message sender having transmitted a chat message, from the chat room database, and adds the performance skill level data to the chat message data, followed by transmitting the chat message data to each of the user terminal devices 1.

More specifically, in the illustrated example, when data of a chat message is received from the user terminal device 1 of one of "Mr. A", "Mr. B" and "Mr. C" as participants in the chat being currently held in the techno chat room, the control section 51 of the server 5 stores the chat message data in the chat database. Further, the control section 51 reads out performance skill level data concerning the message sender from the chat room database, and adds the performance skill level data to the chat message data, followed by transmitting the chat message data having the performance skill level data added thereto to each of the user terminal devices 1 of "Mr. A", "Mr. B" and "C".

Figure 21:
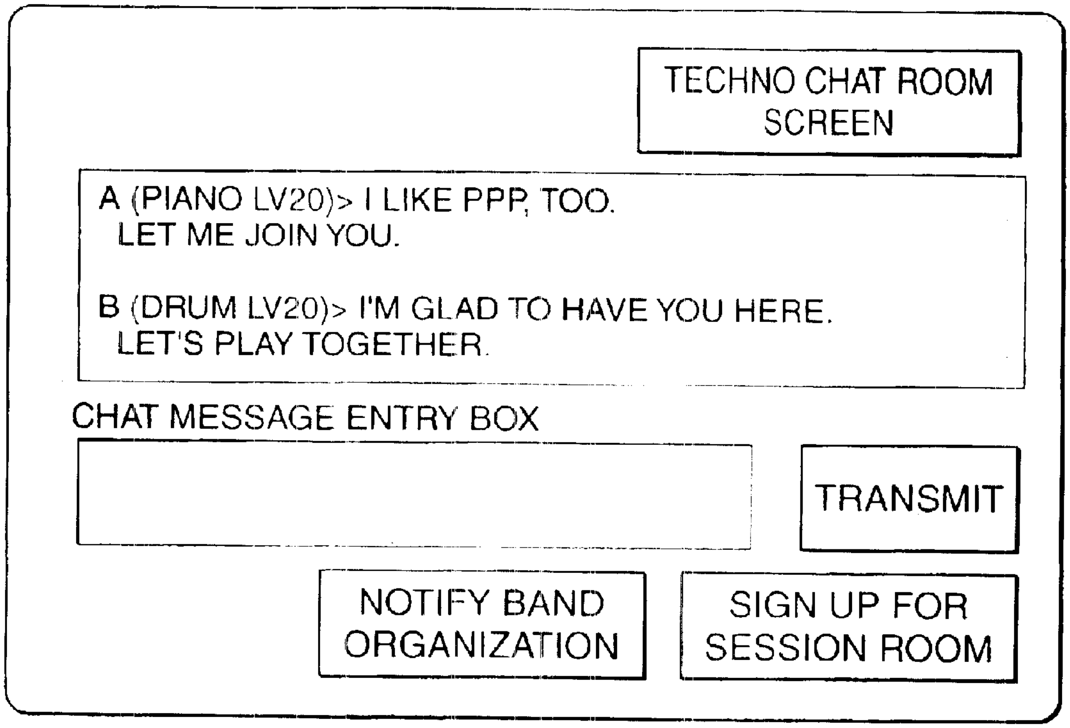
FIG. 21 is a diagram showing an example a techno chat room screen displayed on the display of the user terminal device when the user stays in the chat room.

FIG. 21 illustrates a screen displayed on the display 131 of each of the user terminal devices 1 of "Mr. A", "Mr. B" and "Mr. C" as a result of the above control processing. As described above, "Mr. A", "Mr. B" and "Mr. C" can recognize not only messages of the chat, but also each other's musical instruments and musical instrument performance skills (performance skill levels), which makes it possible to continue the chat efficiently for organization of a band.

As described above, the chat rooms in the system 100 are provided on a music genre-by music genre basis, and hence users accessing the same chat room are supposed to have the same musical taste. In the illustrated example, "Mr. A", "Mr. B" and "Mr. C" who like music in the techno genre enter the techno chat room to have a chat directed to organization of a band, so that they can have a more efficient chat for organization of the band than by the conventional methods.

Further, on the chat screen are displayed not only chat messages but also information indicative of message senders' musical instruments and performance skill levels. The respective pieces of information of the users' performance skill levels are uniformly generated based on the same judgment criteria, and hence the users can have the chat directed to organization of a band based on recognition of each other's musical instruments and performance skill levels.

This makes it possible to efficiently achieve organization of a band without causing the conventional problem that differences in the performance skill level among band members are recognized after the start of actual band activities, only to make the band activities unenjoyable.

When the users successfully reach an agreement on organization of a band through the chat, one of the users clicks on a software button "Notify Band Organization" on the FIG. 21 chat room screen. Responsive to this operation, the control section 11 of the user terminal device 1 sends a signal corresponding to the operation as a band organization notification to the server 5.

Figure 22:
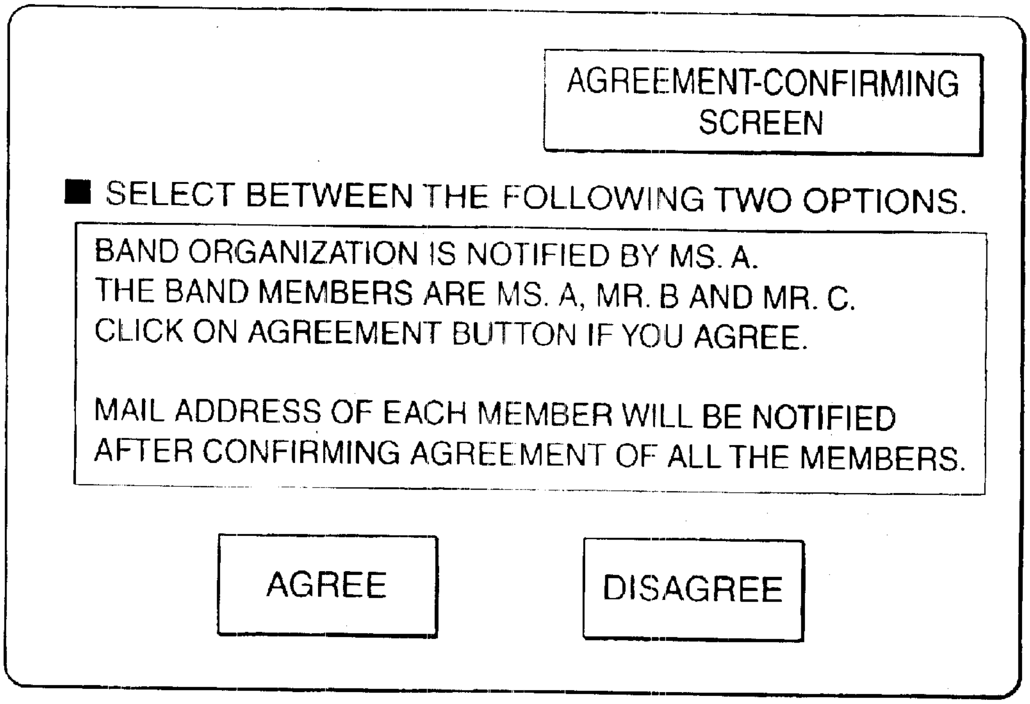
FIG. 22 is a diagram showing an example of an agreement-confirming screen displayed on the display of the user terminal device of a user of a band to be organized.

On the other hand, the server 5 transmits HTML data to each of the user terminal devices 1, together with a control signal for causing the user terminal device 1 to display an agreement-confirming screen, shown in FIG. 22 by way of example, on the display 131.

As shown in FIG. 22, on the agreement-confirming screen are displayed a message asking each of the users whether or not he/she agrees to organization of the band. A user who agrees to the organization of the band operates his/her user terminal device 1 to click on a software button "Agree". Responsive to this operation, the control section 11 of the user terminal device 1 sends a signal corresponding to the operation as an agreement notification to the server 5.

When receiving the agreement notification from each of the user terminal devices 1, the control section 51 of the server 5 reads out the respective pieces of personal information (mail addresses in the case of the present system 100) of the users who agreed to the organization of the band, from the user database, and transmits these to the user terminal device 1 of each user.

Thus, the users having agreed on the organization of the band through the chat are informed of each other's mail addresses, whereafter the mail addresses can be utilized for making more detailed arrangements for band activities.

The above are the control operations carried out by the server 5 when users utilize a chat room.

Operations in Session Room

The system 100 is also configured to enable users having organized a band through a chat to hold a net session. The net session means real-time transmission and reception of musical tone data between the user terminal devices 1 via the Internet 4. In the net session, the users living far from each other can feel as if they were playing together in the same place.

When the users organizing the band have agreed through the chat to hold a net session, one of the users clicks on a software button "Sign up for Session Room" on the FIG. 21 chat room screen. Responsive to this operation, the control section 11 of the user terminal device 1 sends a signal corresponding to the operation as a notification of signing up for a net session to the server 5.

Figure 23:
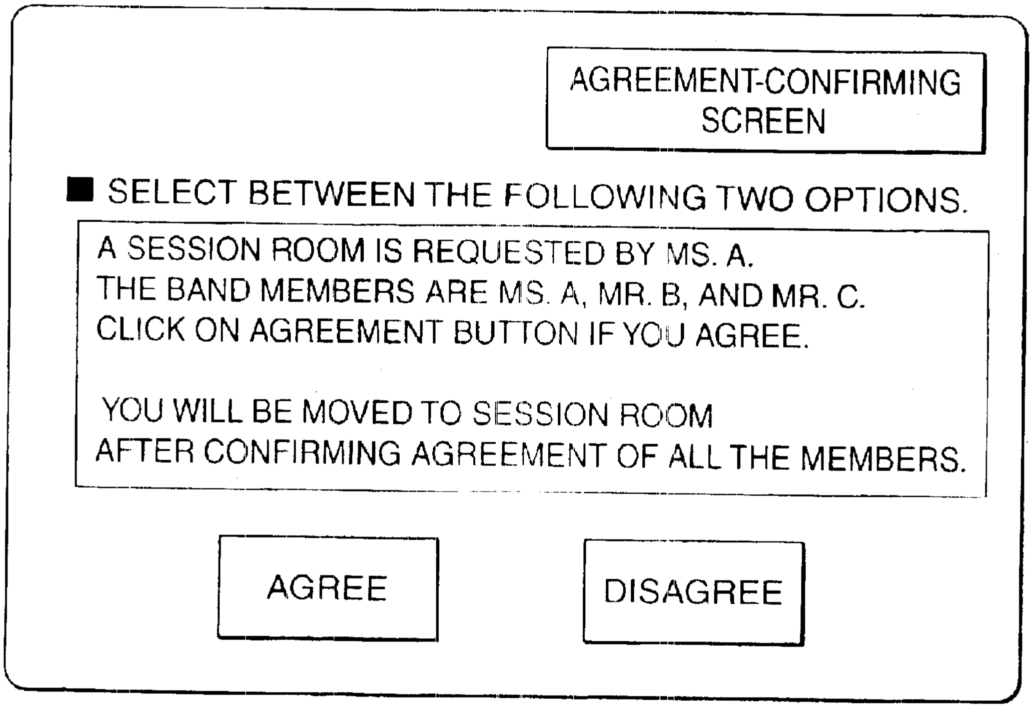
FIG. 23 is a diagram showing an example of an agreement-confirming screen displayed on the display of the user terminal device of a user about to enter a session room.

On the other hand, when receiving the notification of signing up for a net session, the control section 51 of the server 5 transmits HTML data to each of the user terminal devices 1 and causes the user terminal device 1 to display an agreement-confirming screen, shown in FIG. 23 by way of example, on the display 131.

As shown in FIG. 23, on the agreement-confirming screen are displayed a message asking each of the users whether or not he/she agrees to hold the net session. A user who agrees to hold the net session operates his/her user terminal device 1 to click on a software button "Agree". Responsive to this operation, the control section 11 of the user terminal device 1 sends a signal corresponding to the operation as an agreement notification to the server 5.

When receiving the agreement notification from each of the user terminal devices 1, the control section 51 of the server 5 opens a session room and switches the access destination of the user terminal devices 1 of the users (band members) who agreed to hold the net session, to the session room, to thereby provide services for the net session.

Figure 24:
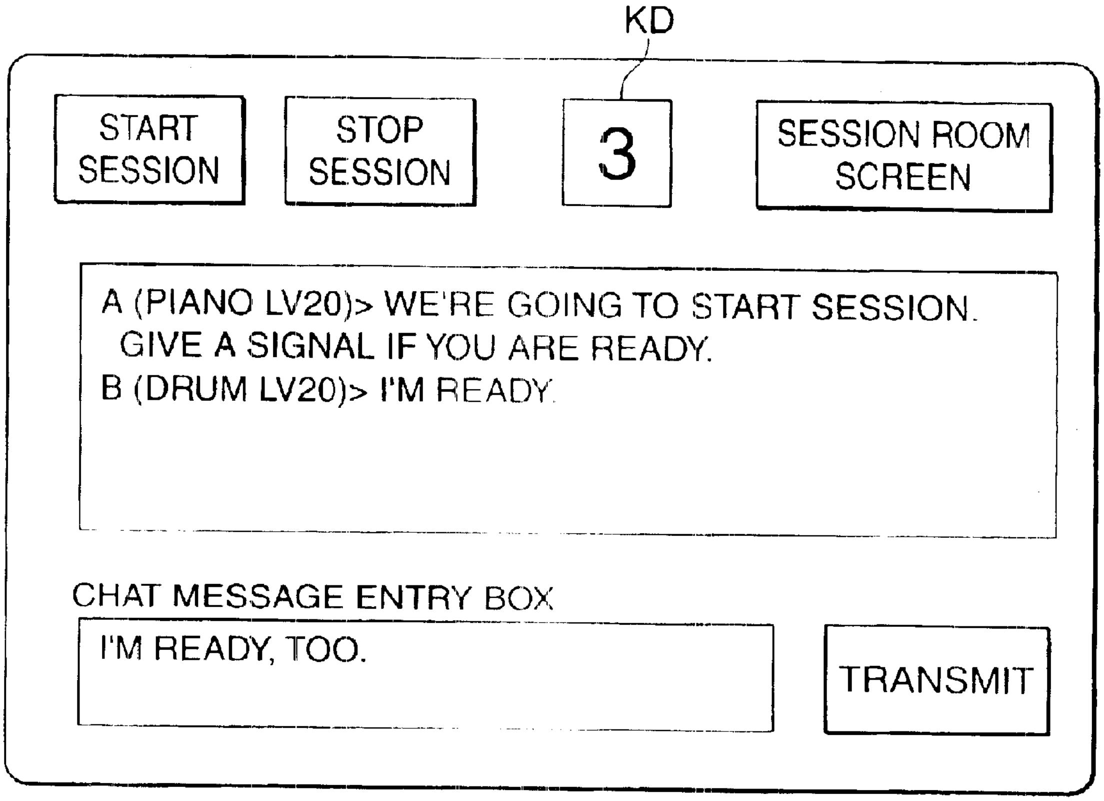
FIG. 24 is a diagram showing an example a session room screen displayed on the display of the user terminal device.

More specifically, the control section 51 of the server 5 transmits HTML data to the user terminal devices 1, together with a control signal for causing each user terminal device 1 to display a session room screen, shown in FIG. 24 by way of example, on the display 131. At the same time, the control section 51 stores respective pieces of information (e.g. ID numbers) of the users having entered the session room, in the session room database in the HDD 52.

In the following, details of operations of the server 5 for controlling a session room will be described.

Whenever receiving musical tone data (MIDI data) from a user terminal device 1 in the session, the control section 51 of the server 5 causes the received MIDI data to be sent to each of the user terminal devices 1 of the other band members. In other words, the control section 51 causes MIDI data transmitted from one of the band members to be sent to each of the user terminal devices 1 of the other band members thereby allowing musical performance data of one band member to be shared by the others.

Now, let it be assumed, as a concrete example, that three users, A, B, and C have organized a band and signed up for a session room.

Figure 25:
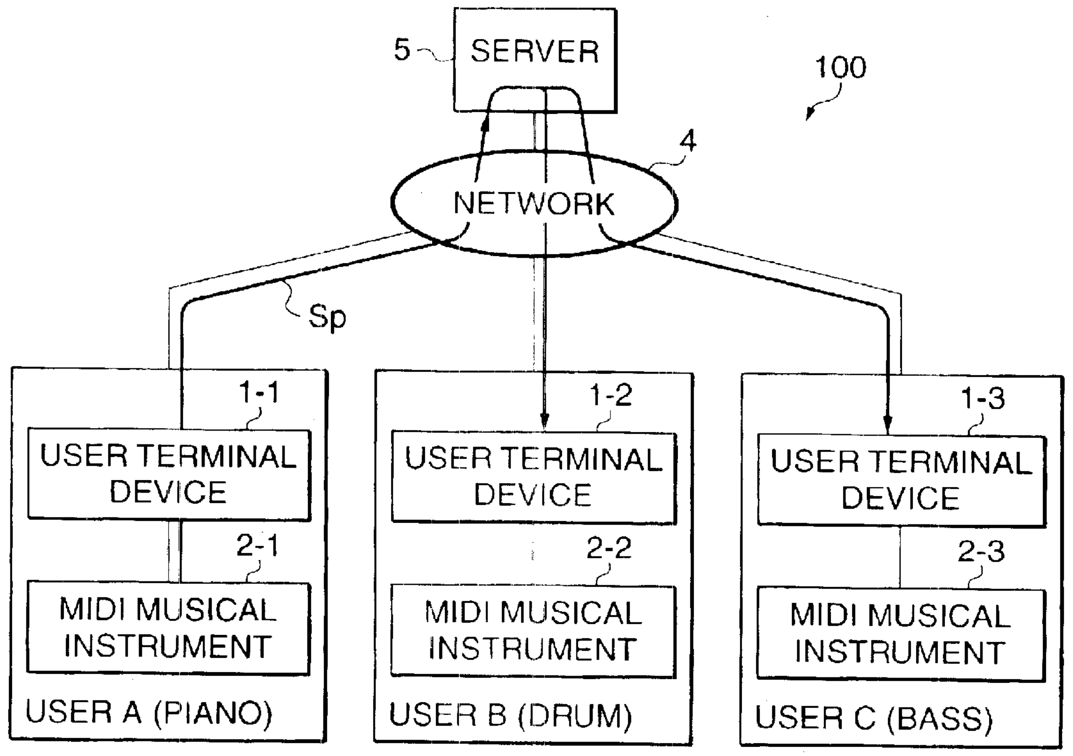
FIG. 25 is a diagram useful in explaining operations carried out when users are in a session room.

FIG. 25 is a diagram useful in explaining operations in the session room.

When one user (e.g. user A) operates a user terminal device 1-1 to click on a software button "Start Session" on the FIG. 24 session room screen, the control section 11 of the user terminal device 1-1 transmits a session start notification to the server 5.

When receiving the notification, the control section 51 of the server 5 executes count-down control for causing each of user terminal devices 1 to carry out cont-down display control for switching the count-down information KD in the order of "3"→"2"→"1"→ "Start" on the display 131.

In FIG. 25, after the count down is completed, a signal Sp representative of a performance by user A on a MIDI musical instrument 2-1 are sent to the server 5 from the MIDI musical instrument 2-1 via the user terminal device 1-1 and the Internet 4. When receiving the signal Sp, the control section 51 of the server 5 carries out control to send the received signal Sp to a user terminal device 1-2 of user B and a user terminal device 1-3 of user C. FIG. 25 schematically shows the data flow. User B's user terminal device 1-2 and user C's user terminal device 1-3 are controlled to output musical tones corresponding to the performance by user A, so that user B and user C can share the performance by user A.

Figure 26:
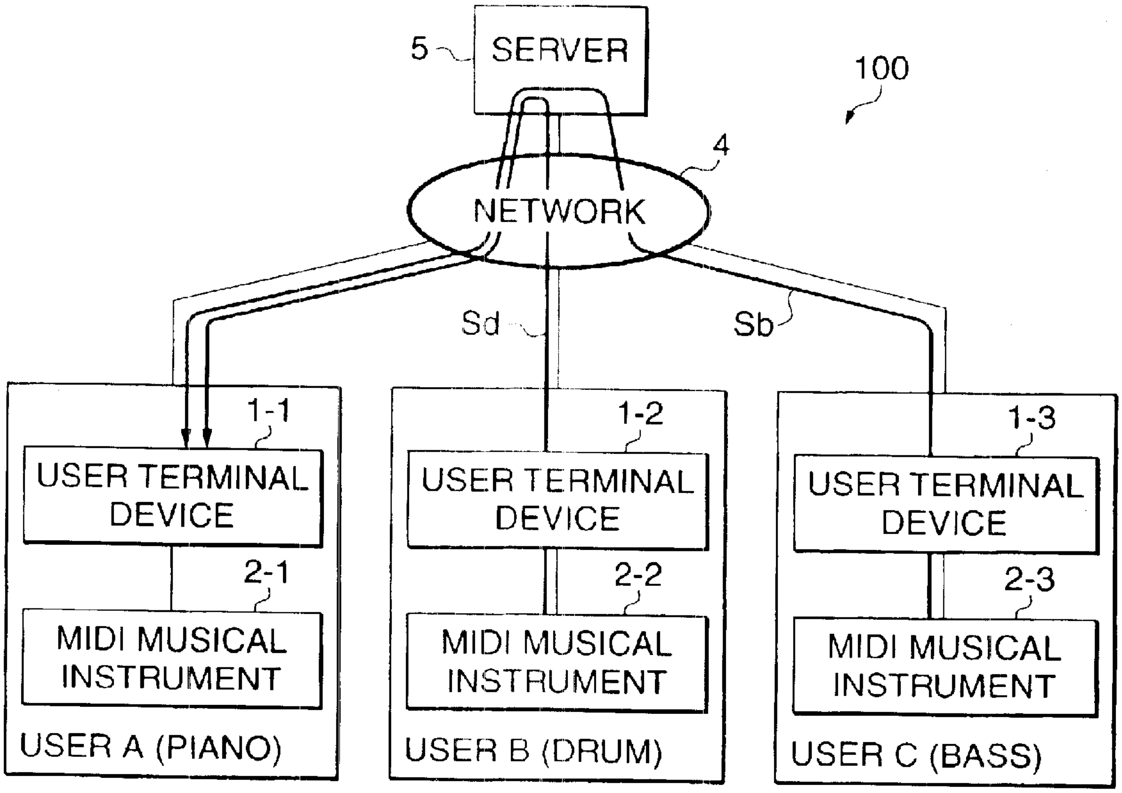
FIG. 26 is a diagram useful in explaining operations carried out when the users are in the session room.

On the other hand, a signal Sd corresponding to user B's performance and a signal Sb corresponding to user C's performance are each sent by the server 5 to the user terminal devices 1 of band members other than user B or user C. FIG. 26 schematically shows respective flows of the signal Sd representative of user B's performance and signal Sb representative of user C's performance both sent to the user terminal device 1-1 of the user A.

As is apparent from FIGS. 25 and 26, user A is placed in an environment where his/her own performance is output from the MIDI musical instrument 2-1, and at the same time the performances by user B and user C are sounded through the speaker **16*s* of the user terminal device 1-1**. This enables the user A to enjoy the same pleasure that he can enjoy when he/she is playing (having a session) together with user B and user C in the same place.

The above description of the environment for user A holds true with respective environments of users B and C. Thus, each of the band members can transmit information of his/her own musical instrument performance and receives information of the other band members' musical instrument performances via the Internet 4 in real time, which makes it possible to realize the net session.

The above are the operations controlled by the server 5 when a net session room is utilized by users.

As described above, according to the system 100, it is possible to support each user in various respects when a band is organized.

The above embodiment of the present invention is described only by way of example, and it can be modified without departing from the spirit and scope of the present invention. For instance, the following are possible variations.

The judgment method for judging a performance skill level can be modified as desired. More specifically, the characteristic feature of the present system 100 consists in that users' performance skill levels are determined based on the same judgment criteria, and therefore even if a modified judgment method is used, the same advantageous effects as provided by the above embodiment can be obtained.

Although in the above embodiment, out of MIDI data as a user's performance data, items for judgment are set to timing and intensity of each musical tone to be sounded, judgment of user's performance skill may be made not only on these items, but also on other items, such as a pitch bend (effect obtained by temporarily increasing and decreasing the pitch), a program change (change of tone color), and so forth. Also in this case, ideal performance data is prepared in advance, and users' performance skill levels can be uniformly determined based on the amount of deviation (difference) from the ideal performance data.

Although in the above embodiment, performance skill level data indicative of judgment of a user's performance skill level is generated as an encoded data file in a predetermined format, the result of the judgment may be embedded in original MIDI data. For instance, in the case of MIDI data, data representative of the result of judgment may be embedded in the MIDI data, as a meta-event in the MIDI file format. In this case, the MIDI data having the judgment data embedded therein is sent from a user terminal device 1 to the server 5.

Alternatively, MIDI data representative of a user's musical performance may be sent to the server 5 so that the server 5 can judge the user's performance skill level. In this case, a predetermined program for judging users' performance skill levels is provided in advance in the server 5.

Further, the format of musical tone data is not limited to the MIDI file format, but judgment may be performed on audio data, and the result of the judgment may be added to the audio data, as additional sequence data. In this case, the sequence data is sent from the user terminal device 1 to the server 5.

A musical instrument other than a MIDI musical instrument 2 may be used as a component of the system.

For instance, it is also possible to use a conventional acoustic piano as a musical instrument. In this case, it is only required to additionally provide a device (e.g. a microphone) for collecting tones of the acoustic piano and a conversion device for converting a signal of the collected tones to a MIDI signal, as a component of the system. According to this configuration, a signal of musical tones of a user performance collected e.g. by a microphone can be converted to a MIDI signal, and hence by supplying this MIDI signal to the user terminal device 1, it is possible to obtain the same advantageous effects as provided by the above embodiment.

Further, data dealt by the system 100 may not be MIDI-formatted data. More specifically, so long as the data is formatted such that it can be transmitted from a user terminal device 1 to the server 5 via the Internet 4, the data is not necessarily be limited to MIDI data.

The system may be operated such that performance skill level data of each user is registered in the server 5 as in the above embodiment, and then the registered data is sent as data of a candidate band member to the user terminal device 1 of each user. For instance, as illustrated in FIG. 27, a list of users each having registered his/her own performance skill level data may be displayed on the display 131 of the user terminal device 1 of each user who demands the list. In this case, the user selects candidate band members according to his/her own performance skill level. When the user actually wants to make contact with the candidate band members (for inquiry), the user sends a contact request to the server 5. Then, the server 5 notifies the request to the user terminal devices 1 of the candidate band members, and thereafter leaves the progress to mutual communications between the users.

Although in the above embodiment, it is assumed that one user plays one musical instrument, in view of multi-instrument players capable of playing a plurality of musical instruments, the system may be configured such that one user can register a plurality of performance skill level data items.

In this case, it is necessary for a user as a multi-instrument player to generate his/her performance skill level data for each musical instrument played by him/her and register the generated performance skill level data items in the server 5.

Then, if the user's performance skill level data items concerning the plurality of musical instruments are disclosed in a chat room, it is possible to organize a band flexibly in accordance with intentions and preferences of chat participants.

For instance, it is possible to support even a user who is a semi-professional pianist but just a beginner as a bassist, so that the user can participate in band activities according to each of the respective performance skills of musical instruments.

Although in the above embodiment, the system is configured to use general-purpose apparatuses, such as a personal computer for the user terminal device 1 and an electronic piano for the MIDI musical instrument 2, the use of a dedicated apparatus may be contemplated that have both the functions of the user terminal device 1 and the MIDI musical instrument 2.

In this case, the dedicated apparatus can be sold to a user in a state in which programs (e.g. a program for generating performance skill level data and a program for starting a net session) necessary for making use of the system 100 are installed therein in advance, so that the user can make use of the system 100 simply by connecting the dedicated apparatus to the Internet 4, whereby the necessary steps of making use the system 100 can be simplified.

In the system 100 of the above embodiment, the MIDI musical instrument 2 may be omitted. For instance, if there is provided an application program for enabling a keyboard for use with the user terminal device 1 to be used as (the keyboard of) a musical instrument, the user can utilize the system 100 by using his/her own personal computer alone. A net session can also be enjoyed without a MIDI musical instrument 2.

The process to execution of a net session can also be modified as desired.

For instance, the state of a session room may also be disclosed to users having accessed a chat room.

FIG. 28 illustrates a chat room screen according to the present variation, by way of example. On this chat room screen, there are displayed information (including musical instruments played, performance skill levels, etc.) of users in session rooms, information of musical pieces being played for respective sessions, and so forth, in addition to chat messages inherent thereto. These kinds of information are stored in the session room database in the HDD 52.

Further, on the screen, there are also displayed pieces of information as to whether participation in each session is allowed, and whether observation of the session is allowed though participation is not allowed. These pieces of information are generated based on information sent from band members in each session room.

When a user notifies the server 5 that he/she wants to participate in a session, the control section 51 of the server 5 provides the following control: The control section 51 causes the MIDI data received from each of the user terminal devices 1 of the corresponding session members to be also transmitted to the user terminal device 1 of the new participant or member, and at the same time cause MIDI data received from the new participant or member to be transmitted to each of the user terminal devices 1 of the other session members. This control enables the new participant or member as well to participate in the net session.

Further, when a user notifies the server 5 that he/she wants to observe a session, the control section 51 of the server 5 causes MIDI data received from each of the user terminal devices 1 of the corresponding session members to be transmitted to the user terminal device 1 of the user who wants to observe the session. This control makes it possible to provide information of the session being currently held not only to the members, but also to the user who wants to observe the session.

In the present variation, e.g. when members are fixed except for a pianist, it is possible to start a session in a session room without a pianist for the time being, and continue the session while waiting for a pianist to participate later. Therefore, a band can be organized promptly, and band activities can be started from an earlier stage.

The present variation is also advantageous in that when one or more members have left a net session after it was started, it is possible to raise substitute members.

The manner of performing a net session can also be modified as desired. Although in the above embodiment, it is assumed that the band members play the musical instruments simultaneously, this is not limitative, but so-called overlap recording may be carried out.

For instance, a drummer plays first, and the result of the musical performance is stored in the server 5 via the Internet 4. Then, the server 5 transmits recorded data of the drummer's musical performance to the user terminal device 1 of a bassist. The bassist plays while listening to the recorded data of the drum part, and the result of his musical performance is stored in the server 5 via the Internet 4. Finally, the server 5 transmits recorded data of the drummer's musical performance and the bassist's musical performance to the user terminal device 1 of a pianist. The pianist plays while listening to the recorded data of the drum part and the bass part, and the result of his musical performance is stored in the server 5 via the Internet 4.

The three musical instrument parts are thus recorded, and then data finally obtained by mixing down the musical performances by the respective players in the server 5 is transmitted to each of the user terminal devices 1. There may be such a form of session.

Further, it can be assumed that a musical piece, such as an Asian folk musical piece, in which no serious problem is caused by deviation in timing of respective performances by players, is played in a session. In the session of this music genre, since control for adjusting timing is not necessarily required, the server 5 may only perform non-flexible processing control e.g. only by transmitting musical tone data received from each user terminal device 1 to the other user terminal devices 1.

In a net session room, a theme musical piece may be provided to allow a plurality of bands to compete with each other in performance skill in playing the theme musical piece in a session.

In this case, the system may be operated such that the server 5 can record a musical performance in each session and make a comparison between the recorded data of each of the musical performances and an ideal performance data to announce ranking on the network, as a contest result. This kind of event can encourage users to practice on musical instruments, and at the same time contribute to stable management of the system 100.

Further, the object of the present invention may be accomplished by supplying a storage medium in which is stored a software program realizing the functions of the above-mentioned embodiment and variations to a system or apparatus, and causing a computer (CPU or MPU) of the system or apparatus to read out and execute the program stored in the storage medium.

In this case, the code of the program itself read out from the storage medium achieves the functions of the above embodiments, and the storage medium storing the program constitutes the present invention.

The control programs for the system 100 can be installed in the server 5 by any one of optional methods. For instance, the program for controlling the server 5 in the system 100 can be stored in a CD-ROM (Compact Disc Read Only Memory) or an MO (Magneto Optic) and then installed in the server 5 by using a CD-ROM drive or the like. Alternatively, the program may be installed by so-called network distribution through data communication via the Internet 4, not by using a storage medium, such as a CD-ROM.

What is claimed is:

1. A player information-providing method of providing information of a player from a server to an information access terminal device via a network, comprising the steps of:

storing in the server a result of a judgment made on a performance skill level of the player by a performance skill level-judging device for judging a player's performance skill level;

transmitting the result of the judgment made on the performance skill level of the player, the result being stored in the server, to the information access terminal device via the network in response to access of the information access terminal device to the server via the network; and transmitting, when a chat is being held by a plurality of information access terminal devices as the information access terminal device by using the server, the result of the judgment concerning a player as a message sender of the chat from the server to the information access terminal devices participating in the chat.

2. A player information-providing method according to claim 1, comprising the step of transmitting, when an agreement notification indicating agreement to organization of a band by required members is transmitted to the server from each of the information access terminal devices of the required members during the chat, personal information of each of the required members, the personal information being stored in storage means, from the server to the information access terminal devices of the required members.

3. A player information-providing method according to claim 1, comprising the step of receiving, when an agreement notification indicating agreement to holding a net session by required members is transmitted to the server from each of the information access terminal devices of the required members during the chat, musical tone data transmitted from an information access terminal device of one of the required members, by the server, and then transmitting the received musical tone data from the server to information access terminal devices of remaining ones of the required members.

4. A server connected to a network, comprising:

a storage that stores a result of a judgment made on a performance skill level of a player by a performance skill level-judging device for judging a player's performance skill level; and a transmitter that transmits the result of the judgment made on the performance skill level of the player, the result being stored in the server, to an information access terminal device via the network in response to access of the information access terminal device to the server via the network, wherein when a chat is being held by a plurality of information access terminal devices as the information access terminal device by using the server, said transmitter transmits the result of the judgment concerning a player as a message sender of the chat to the information access terminal devices participating in the chat.

5. A server according to claim 4, wherein when an agreement notification indicating agreement to organization of a band by required members is transmitted from each of the information access terminal devices of the required members during the chat, said transmitter transmits personal information of each of the required members to the information access terminal devices of the required members.

6. A server according to claim 4, further comprising a receiver for receiving, when a notification of agreement indicating agreement to holding a net session by required members is transmitted from each of the information access terminal devices of the required members during the chat, musical tone data transmitted from an information access terminal device of one of the required members, and wherein said transmitter transmits the received musical tone data to information access terminal devices of remaining ones of the required members.

7. A program executed by a computer, for controlling a server connected to a network and including a storage, the program comprising:

a storage module for causing a result of a judgment made on a performance skill level of a player by a performance skill level-judging device for judging a player's performance skill level to be stored in a predetermined area in the storage; and a control module operable when an information access terminal device accesses the server via the network, for causing the result of the judgment made on the performance skill level of the player, the result being stored in the server, to be transmitted to the information access terminal device via the network; and;

a transmitter module operable when a chat is being held by a plurality of information access terminal devices as the information access terminal device by using the server, for causing the result of the judgment concerning a player as a message sender of the chat to be transmitted to the information access terminal devices participating in the chat.

8. A computer-readable storage medium storing a program for controlling a server connected to a network and including a storage, the program comprising:

a storage module for causing a result of a judgment made on a performance skill level of a player by a performance skill level-judging device for judging a player's performance skill level to be stored in a predetermined area in the storage;

a control module operable when an information access terminal device accesses the server via the network, for causing the result of the judgment made on the performance skill level of the player, the result being stored in the server, to be transmitted to the information access terminal device via the network; and a transmitter module operable when a chat is being held by a plurality of information access terminal devices as the information access terminal device by using the server, for causing the result of the judgment concerning a player as a message sender of the chat to be transmitted to the information access terminal devices participating in the chat.

* * * * *